United States Patent
Aloui et al.

(10) Patent No.: US 12,189,882 B2
(45) Date of Patent: Jan. 7, 2025

(54) FORCE SENSOR

(71) Applicant: COMMISSARIAT A L'ENERGIE ATOMIQUE ET AUX ENERGIES ALTERNATIVES, Paris (FR)

(72) Inventors: Saifeddine Aloui, Grenoble (FR); Franck Vial, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 68 days.

(21) Appl. No.: 17/644,118

(22) Filed: Dec. 14, 2021

(65) Prior Publication Data

US 2022/0187971 A1 Jun. 16, 2022

(30) Foreign Application Priority Data

Dec. 16, 2020 (FR) ..................... 20 13360

(51) Int. Cl.
*G06F 3/041* (2006.01)
*G06F 3/044* (2006.01)

(52) U.S. Cl.
CPC ........ *G06F 3/04144* (2019.05); *G06F 3/0445* (2019.05); *G06F 3/0446* (2019.05); *G06F 3/0447* (2019.05); *G06F 2203/04105* (2013.01)

(58) Field of Classification Search
CPC .. G06F 3/04144; G06F 3/0445; G06F 3/0446; G06F 3/0447; G06F 2203/04105; G01L 1/146; G01L 1/205; G01L 1/2206; G01L 5/165; G01L 5/162
See application file for complete search history.

(56) References Cited

U.S. PATENT DOCUMENTS

| | | | |
|---|---|---|---|
| 8,272,278 B2 | 9/2012 | Loeb et al. | |
| 8,411,140 B2 | 4/2013 | Adelson | |
| 9,372,588 B2 | 6/2016 | Dietz et al. | |
| 10,067,019 B2 | 9/2018 | Bradford et al. | |

(Continued)

FOREIGN PATENT DOCUMENTS

| | | |
|---|---|---|
| EP | 1 617 197 B1 | 1/2009 |
| JP | 2006-305658 A | 11/2006 |
| JP | 2020-016444 A | 1/2020 |

(Continued)

OTHER PUBLICATIONS

Machine translation of WO 2008/046123 A2 (Year: 2008).*

(Continued)

*Primary Examiner* — Patrick N Edouard
*Assistant Examiner* — Joseph P Fox
(74) *Attorney, Agent, or Firm* — Oblon, McClelland, Maier & Neustadt, L.L.P.

(57) ABSTRACT

A force sensor includes at least one cavity defining at least two surfaces having different orientations. On each of said surfaces is disposed at least one respective detection structure sensitive to a pressure exerted on the corresponding surface. A resiliently deformable medium at least partially fills the cavity by coming into contact with the surfaces and defines a detection surface, on which a force to be detected is likely to be exerted. The application of this force is likely to generate stresses on each detection structure due to the transmission of forces by the medium.

27 Claims, 25 Drawing Sheets

(56) References Cited

U.S. PATENT DOCUMENTS

2009/0200815 A1    8/2009  Sugahara et al.
2018/0074637 A1*   3/2018  Rosenberg .......... G06F 3/03545

FOREIGN PATENT DOCUMENTS

WO    WO-2008046123 A2 *  4/2008  ............. G01L 1/146
WO    WO-2009108334 A2 *  9/2009  ........... G06F 3/0233

OTHER PUBLICATIONS

French Preliminary Search Report issued Sep. 7, 2021 in French Application 20 13360 filed on Dec. 16, 2020, 3 pages (with English Translation of Categories of Cited Documents).
Rosenberg et al., "The UnMousePad—An Interpolating Multi-Touch Force-Sensing Input Pad", ACM Transactions on Graphics, vol. 28, No. 3, Aug. 2009, 9 pages.

* cited by examiner

FORCE SENSOR

TECHNICAL FIELD

The present invention relates to force sensors, and more specifically to those adapted to measure a contact force.

PRIOR ART

Tactile perception is important for certain robotic applications. In order to enable robots to perform tasks like those performed by human beings, for example, those involving holding and/or handling an object, knowing how to detect the contact of an external object with a surface and to measure certain properties thereof, in particular the modulus, the three-dimensional coordinates of the force vector exerted on the contact zone and/or the moment of this force, and even their spatial distribution, is desirable.

U.S. Pat. No. 10,067,019 B2 describes a sensor comprising strain gauges mounted on deformable beams allowing the total force, as well as the moment of the forces applied onto the sensor, to be measured.

Application JP 2020016444 A describes a sensor having a detection surface defined by a dome, resting, at the base thereof, on a flat multi-point detection structure, which enables the reaction stresses that are locally exerted on the detection structure in response to the application of a force onto the dome to be known.

Patent EP 1617197 B1 discloses another type of sensor, of the "pin" type, comprising a rigid rod, onto which a force can be exerted, said force being able to be measured by virtue of a deformable element secured to the rod and supporting measurement means.

U.S. Pat. No. 9,372,588 B2 describes a touch sensor comprising piezo-resistive detection cells with a matrix distribution, in order to measure the distribution of pressure on a flat surface. Such a sensor only allows forces normal to the contact surface to be detected, and not the spatial components of the force and/or its moment.

It is also known for optical means to be used to measure certain properties of a contact with an external object. U.S. Pat. No. 8,411,140 B2 discloses a touch sensor comprising a transparent and deformable elastomer layer covered with a reflective coating illuminated through the elastomer by LED type light sources. A camera is placed behind the deformable layer in order to view the 3D shape of the contact on the sensor, allowing a resolved geometric measurement of the surface of the object touched by the sensor to be obtained, which sensor has the disadvantage of being relatively large, limiting its use to certain applications.

U.S. Pat. No. 8,272,278 B2 describes a hybrid system that allows several properties of the contact with an object to be measured. Among other things, this system allows the distribution of force on the contact surface to be obtained by virtue of electrodes supported by a rigid support measuring the electrical impedance of a conductive fluid placed between a resilient layer, imitating an artificial skin, and the support. This sensor is relatively complex to produce and it is fraught with sealing constraints due to the use of the fluid.

DISCLOSURE OF THE INVENTION

Consequently, a requirement exists for further improving the force sensors, in particular in order to provide a sensor that is relatively simple and inexpensive to produce, is compatible with large-scale manufacturing, and allows measurement of both a distribution of force exerted on a contact surface and/or the spatial components of the force or its moment, if this is desired.

SUMMARY OF THE INVENTION

The aim of the invention is to address this requirement, which it does, according to a first aspect thereof, by virtue of a force sensor comprising:
- at least one cavity defining at least two surfaces having different orientations;
- on each of said surfaces, at least one respective detection structure sensitive to a pressure exerted on the corresponding surface; and
- a resiliently deformable medium at least partially filling the cavity by coming into contact with said surfaces, and defining a detection surface, on which a force to be detected is likely to be exerted, with the application of this force being likely to generate stresses on each detection structure as a result of the transmission of forces by said medium.

The sensor according to the invention is relatively simple to produce, and allows reliable measurement of a force applied onto the detection surface.

Cavity

The cavity can assume various geometries, as a function of the application and the force components to be measured.

Preferably, the cavity assumes the shape of a polyhedron, in particular a block, for example, of cubic or rectangular parallelepiped shape. Such a shape has the advantage of having a bottom and posts perpendicular to the bottom, which can simplify the computations of the force components. Preferably, at least three surfaces of such a cavity are provided with detection structures, in particular on the bottom and on two opposite posts.

As an alternative embodiment, the cavity assumes a cylindrical shape, in particular rotationally cylindrical.

The sensor can comprise a hollow rigid support supporting said detection structures.

This support can be made of metal, glass, ceramic or plastic material, among other usable materials.

Resiliently Deformable Medium

The resiliently deformable medium can fill the cavity so as to be flush with the opening thereof. As an alternative embodiment, the resiliently deformable medium extends outside of the cavity. For example, and in particular when the resiliently deformable medium extends outside of the cavity, the detection surface defined by the resiliently deformable medium assumes an outwardly convex shape, for example, a dome shape, approximating the shape of a fingertip, a mushroom or a pin, for example. The resiliently deformable medium preferably exhibits isotropic resilient behavior. In particular, it can be homogeneous.

The resiliently deformable medium exhibits hardness, for example, on the Shore scale ranging between 30 and 95, preferably between 40 and 80.

The resiliently deformable medium can be an elastomer, for example, a thermoplastic elastomer introduced into the cavity in the fluid state, or an elastomer that has polymerized in the cavity. It involves, for example, a polyurethane, but other materials can be suitable, for example, thermoplastic elastomers or silicones.

Detection Structures

The sensor comprises at least two detection structures, and preferably as many detection structures as the cavity has faces with different orientations. The term "orientation" refers to the direction of the vector normal to the surface.

Two parallel and opposite flat surfaces thus will have different orientations, since they are opposite.

In the case of a cavity in the form of a block, the sensor preferably comprises five detection structures, namely one on the bottom of the cavity and four more on the posts of the cavity. The detection structures can be multi-point or single-point measurement structures. "Multi-point" should be understood to mean that the detection structure is configured to measure the pressure that is applied thereto on at least two separate points. "Single-point" should be understood to mean that the detection structure only allows the applied pressure to be measured at one point of the detection structure, preferably at the center thereof.

In the case of a multi-point detection, the detection is preferably carried out at points that are evenly distributed over the detection structure, for example, evenly spaced apart over the width and height of the detection structure, with the measurement points being disposed, for example, like the intersections of a grid.

According to one embodiment of the invention, at least one of the detection structures is a multi-point measurement structure, and preferably all the detection structures are multi-point measurement structures. With a single cavity this allows detection accuracy to be provided that allows not only the orientation of the force but also the torque exerted on the detection surface to be known, by virtue of the knowledge of the distributions of pressure on the detection surfaces.

According to another embodiment of the invention, at least one of the detection structures is a single-point measurement structure. In this case, the sensor comprises, for example, a plurality of cavities, called single cavities, each provided with single-point detection structures.

The detection structures can be produced in various ways, on the understanding that any detection structure adapted to deliver a signal representing the pressure exerted thereon can be suitable.

Thus, at least one of the detection structures can comprise at least one strain gauge.

At least one of the detection structures can comprise piezo-resistive or capacitive detection means.

Preferably, the detection structures are piezo-resistive, with such structures being economical to produce. In this case, the pressure applied on a measurement point is accompanied by a variation in electrical resistance between at least two measurement electrodes.

At least one of the detection structures, and in particular each detection structure, can comprise:
  at least one first electrode disposed on the face of the detection structure on an underlying support, in particular in contact therewith; and
  at least one second electrode disposed on the face of the detection structure on the resiliently deformable medium, in particular in contact therewith.

These electrodes can be separated by one or more layers of one or more materials, so that a pressure exerted on a measurement point is accompanied by a variation in the impedance between the electrodes.

Preferably, the first and second electrodes at least partially overlap. The location of the overlay of the electrodes can coincide with a measurement point.

Preferably, the first and second electrodes each assume a linear shape, in particular in an intersection region of the electrodes. For example, the first and second electrodes intersect each other at right angles, each belonging to a set of electrodes parallel to each other, with the two sets of electrodes intersecting each other like the lines of a grid when the detection structure is viewed transparently from above. Such an arrangement allows reading at measurement points defined by the intersections of the grid, by addressing the row selection and the column selection type.

Thus, at least one of the detection structures, or preferably each of them, can comprise:
  a plurality of first electrodes disposed on the face of the detection structure on an underlying support, in particular in contact therewith; and
  a plurality of second electrodes disposed on the face of the detection structure on the resiliently deformable medium, in particular in contact therewith.

The first electrodes can comprise spaced apart parallel portions, with the second electrodes comprising spaced apart parallel portions intersecting, in a front view, the first portions, in particular being perpendicular thereto.

The electrodes of the detection structures can be produced using any suitable technique, in particular by etching or printing, for example, by screen printing.

For example, the one or more first electrode(s) is/are printed on a first layer of material with low conductivity, the one or more second electrode(s) is/are printed on a second layer of material with low conductivity, with the first and second layers subsequently being assembled so that the electrodes are located on the outer faces of the assembly. In this case, a pressure exerted on a measurement point compresses the two layers together and reduces the contact resistance, with this reduction in resistance being able to be detected. Such an alternative embodiment is advantageous in that it is particularly economical to produce.

As an alternative embodiment, the first and second electrode(s) is/are printed on either side of a layer of an intrinsically piezo-resistive material, in particular a compressible material. In this case, a pressure exerted on a measurement point leads to a local compression of the material, and to a reduction in the impedance between the electrodes.

In another alternative embodiment, the first and second electrode(s) is/are printed on the same face of a substrate, facing a layer with low conductivity, for example, a polymer comprising conductive fillers, in particular carbon fillers. In this case, when a pressure is exerted on a measurement point, the layer with low conductivity comes into contact with the relevant electrodes, allowing electrical contact with resistance that depends on the exerted pressure.

The electrodes of the detection structures can be produced on at least one substrate representing the flattened cavity. For example, for a cube-shaped cavity, the electrodes can be produced on at least one cross-shaped substrate, which is folded when it is placed in a hollow support in order to form the cavity. The branches of the cross can be folded at a right angle relative to the central square of the cross, so as to extend along the posts of the cavity, whereas the central square defines the bottom. On at least two opposite branches, the electrodes each can be U-shaped, with the portion of the electrodes corresponding to the bottom of the U corresponding to the row electrodes, for example, and perpendicularly intersecting the column electrodes. The portions corresponding to the branches of the U preferably extend up to the free end of the branch of the cross, which facilitates electrical connection to a reading circuit.

Processing Circuit

The sensor can be connected to any suitable processing circuit connected to the detection structures and capable of delivering information relating to at least one component of the force applied onto the detection surface.

This processing circuit can comprise a microcontroller or any other electronic circuit capable of delivering said information. It can involve a circuit that is integrated into a housing with the cavity or a circuit that is independent of the support supporting the cavity.

The sensor thus can comprise a circuit for processing signals delivered by the detection structures, representing the pressures induced on these structures by the force applied onto the detection surface, and configured to process them in order to compute at least one component of said force.

Preferably, the processing circuit is configured to measure a distribution of the pressures on at least one of the detection structures. In particular, the processing circuit can be configured to measure at least one component of the moment of the force exerted on the detection surface on the basis of distributions of pressure detected by detection structures on opposite surfaces of the cavity.

In one embodiment, the sensor comprises a plurality of single detection cells, each formed by a single cavity only equipped with single-point detection structures. The cavities of the single detection cells can be integrated on the same support so as to form a matrix of cavities, with the support forming a monolithic block, for example, or can be obtained by assembling separate elements. The deformable medium can form a continuous monolithic block extending into each of the single cavities and defining a detection surface that is common to all the cavities and on which a force to be detected is likely to be exerted.

The processing circuit then can be configured to measure at least one component of a single force that is likely to be exerted on a single cell on the basis of the pressures detected by the single-point detection structures of this cell, and preferably the processing circuit is configured to measure the distribution of at least one component of at least one force likely to be exerted on the detection surface of the sensor on the basis of knowledge of the single forces applied onto the detection cells.

The processing circuit can be configured to detect two separate forces that are likely to be exerted on the sensor. "Separate forces" means two forces applied at separate points of application on the detection surface, these forces may or may not have identical directions and/or standards.

The processing circuit can comprise a reading circuit by addressing rows and columns. The reading circuit can be arranged in order to subject a selected row electrode and a selected column electrode to a predefined potential difference and to measure a resulting current, or to subject the selected electrodes to a predefined current and to measure a voltage. The reading circuit can comprise an analogue-to-digital converter. The reading circuit can be arranged to electrically connect all the electrodes that are not selected for measurement at a given instant to the same potential, for example, to ground, in order to reduce the risk of the accumulation of parasitic loads.

The reading circuit and the processing circuit can be separate components or the same component, for example, a microcontroller.

Measurement Method

A further aim of the invention is a method for measuring at least one component of a force exerted on the detection surface of a sensor according to the invention, comprising the following steps of:
  measuring the electrical disturbances induced by stresses exerted on the one or more measurement zone(s) of the detection structures of the sensor due to the transmission of forces to said zones from the resiliently deformable medium defining the detection surface; and
  computing, on the basis of the disturbances thus measured, at least one component of the force exerted on the sensor.

At least one of the detection structures can be a multi-point structure, in which case a distribution of pressure on said multi-point detection structure can be measured. In particular, at least one component of the moment of the exerted force can be computed on the basis of the measurement of the pressure fields on detection structures present on opposite surfaces of the cavity.

During a calibration phase, the force transmission properties of the resiliently deformable medium can be determined by subjecting the sensor to known mechanical stresses.

The force applied onto the detection surface can be determined as a function of the signals detected by the detection structures by virtue of a trained neural network, in particular for a sensor comprising a relatively complex shaped detection surface.

The neural network can be trained during a calibration phase, during which the sensor is subjected to known mechanical stresses. Techniques other than those based on the use of neural networks, for example, regression algorithms, can be used (for example, SVR, "GradientBoosting", "Random Forest", etc.).

When the detection structures have a matrix arrangement for the electrodes, with row electrodes and column electrodes, for example, in the form of M rows and N columns, with the intersection of the electrodes defining measurement points, the method can comprise the following steps of:
  grounding all the electrodes; and
  repeating, with i being an integer ranging between 1 and N:
    powering the electrode i; and
    repeating, with j being an integer ranging between 1 and M:
      connecting the electrode j to the input of a reading circuit;
      reading the signal on the measurement point corresponding to the intersection of the electrodes i and j; and
      grounding the electrode j; and
    grounding the electrode i.

The successive connection of the electrodes to the reading circuit can be implemented by multiplexing the channels of a single analogue-digital converter, which allows the manufacturing cost of the device to be reduced. As an alternative embodiment, several analogue-digital converters can be used that are read separately. For example, there can be one converter for each electrode j, or two converters each having M/2 channels, if desired.

Manufacturing Method

A further aim of the invention, according to another aspect thereof, is a method for manufacturing a force sensor according to the invention, wherein:
  at least one first electrode assuming a linear shape is printed on a first layer of material with low electrical conductivity;
  at least one second electrode assuming a linear shape is printed on a second layer of material with low electrical conductivity;
  the first and second layers are assembled so that the electrodes are disposed on the outer faces of the assembly and so that the second electrode intersects, in a front view, the first electrode.

In particular, the method can comprise the step involving printing a plurality of first electrodes comprising parallel portions spaced apart on the first layer of material with low conductivity, and a plurality of second electrodes on the second layer of material with low conductivity. "Low conductivity" is understood to mean a material with volume resistivity that is greater than or equal to 1,000 Ohm·cm and is preferably less than or equal to 50,000 Ohm·cm, more preferably 30,000 Ohm·cm, and with surface resistivity that is greater than or equal to 5,000 Ohm/square and is preferably less than or equal to 50,000 Ohm/square, preferably 25,000 Ohm/square. Preferably, it can involve a carbon polymer sheet such as Velostat®.

Preferably, the method comprises a step involving cutting each layer in order to provide it with a shape corresponding to the pattern of the cavity, for example, a cross shape for a cubic or parallelepiped cavity. In this case, the electrodes can be printed as a U-shape, as explained above.

In particular, the layers can be cut when they are stacked.

The method can comprise a step involving integrating the assembly cut as described with a hollow support, with the assembly then defining the faces of a cavity. The cavity then can be at least partially filled with a resiliently deformable material, in particular an elastomer. Then, each electrode of the sensor thus obtained can be electrically connected to a reading circuit of a processing circuit.

BRIEF DESCRIPTION OF THE DRAWINGS

The invention will be better understood from reading the following detailed description of non-limiting embodiments thereof, and with reference to the accompanying drawings, in which.

DETAILED DESCRIPTION

Figure 1:
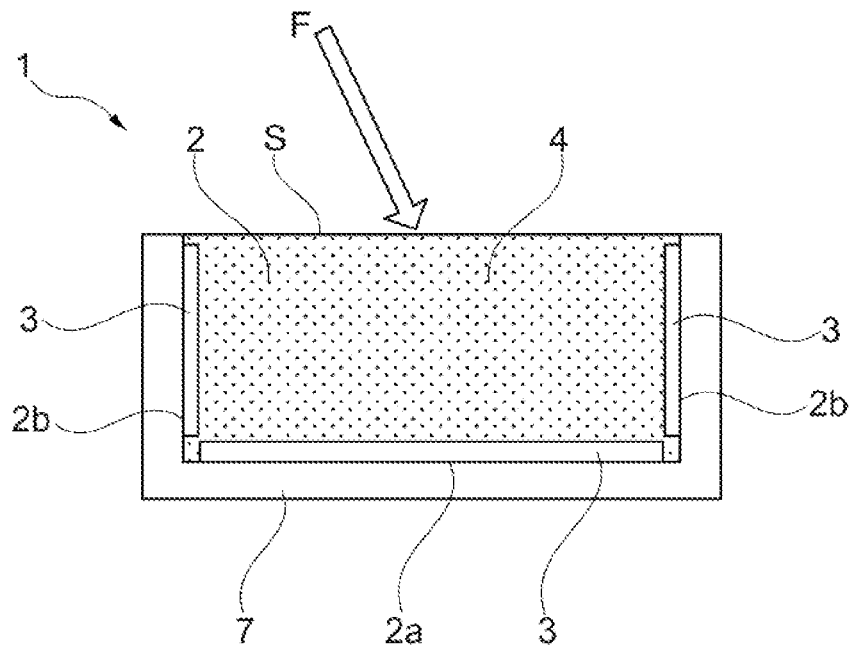
FIG. 1 shows a schematic and partial cross-section of an example of a force sensor according to the invention.

FIG. 1 illustrates an example of a force sensor 1 according to the invention. The sensor 1 comprises a cavity 2 assuming a block shape, defining a rectangular bottom surface 2a and four rectangular surfaces 2b oriented perpendicular to the surface 2a, forming the side faces of the cavity. The cavity 2 is integrated in a hollow support 7, made, for example, from an electrically insulating and preferably rigid material, for example, a rigid plastic, a ceramic or glass. As an alternative embodiment, the support 7 can be made from a metal material, being electrically insulated from the detection structures in contact therewith, if applicable.

A detection structure 3 is located on each of the surfaces 2a and 2b.

The cavity 2 is filled with a deformable medium 4, defining a detection surface S, on which an external force F is applied.

The forces generated by applying the force F are transmitted by the deformable medium 4 to the detection structures 3, which can detect a pressure applied onto their respective surface, with an orientation normal to this surface, and corresponding to the transmitted forces.

Figure 2A:
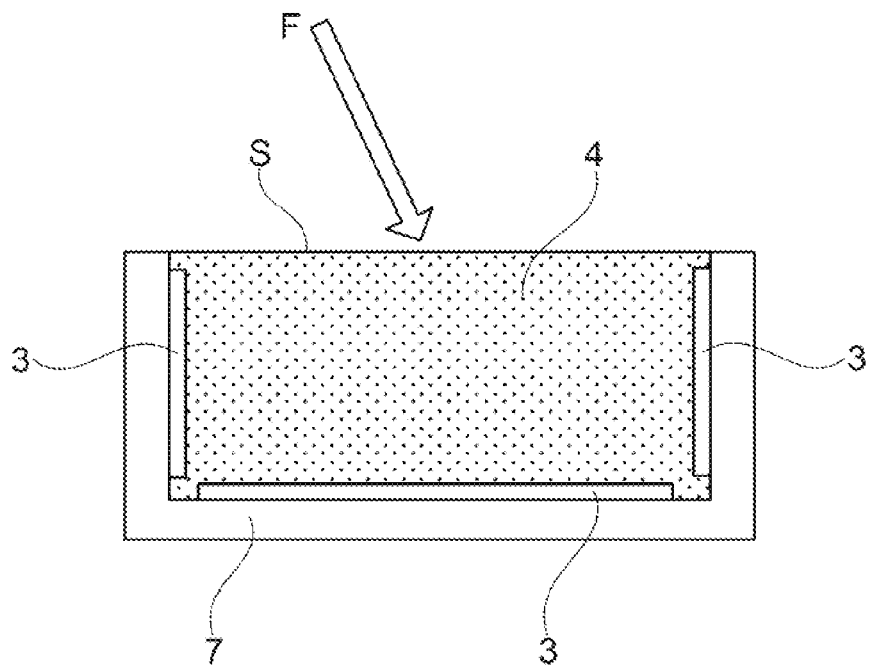
FIG. 2a illustrates a partial and schematic cross-section of an example of a sensor with the deformable medium flush with the opening of the cavity.
Figure 2B:
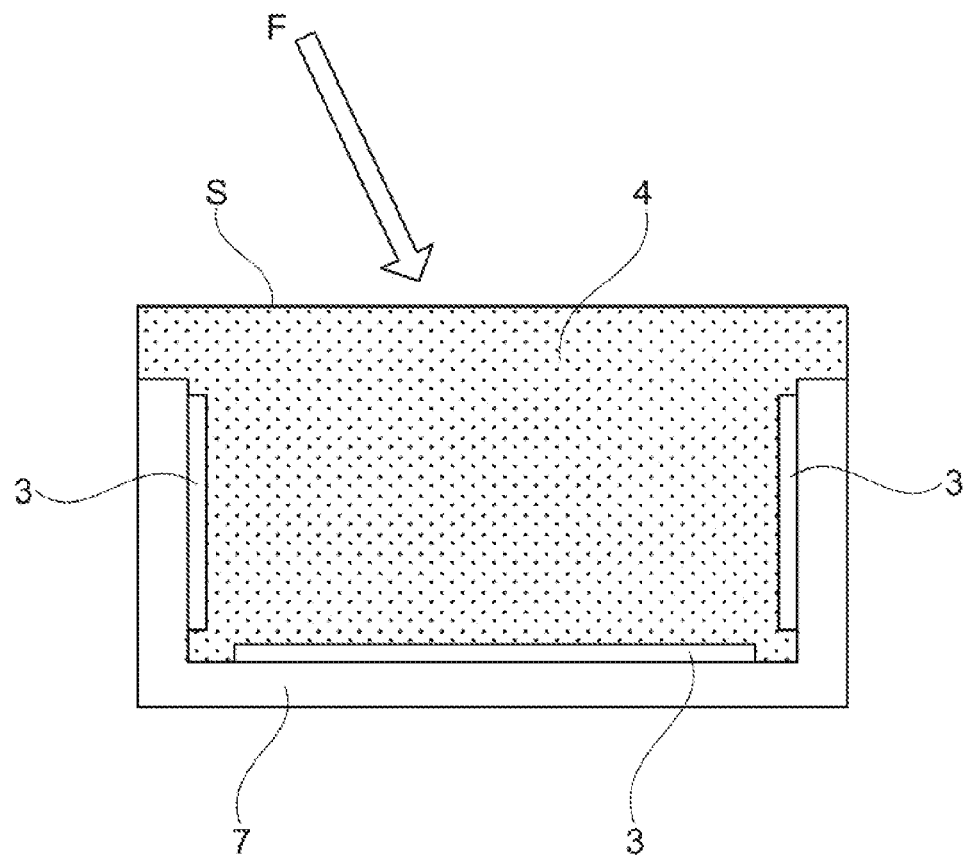
FIG. 2b illustrates a schematic and partial cross-section of an example of a sensor with the deformable medium extending outside of the cavity and defining a flat detection surface.
Figure 2C:
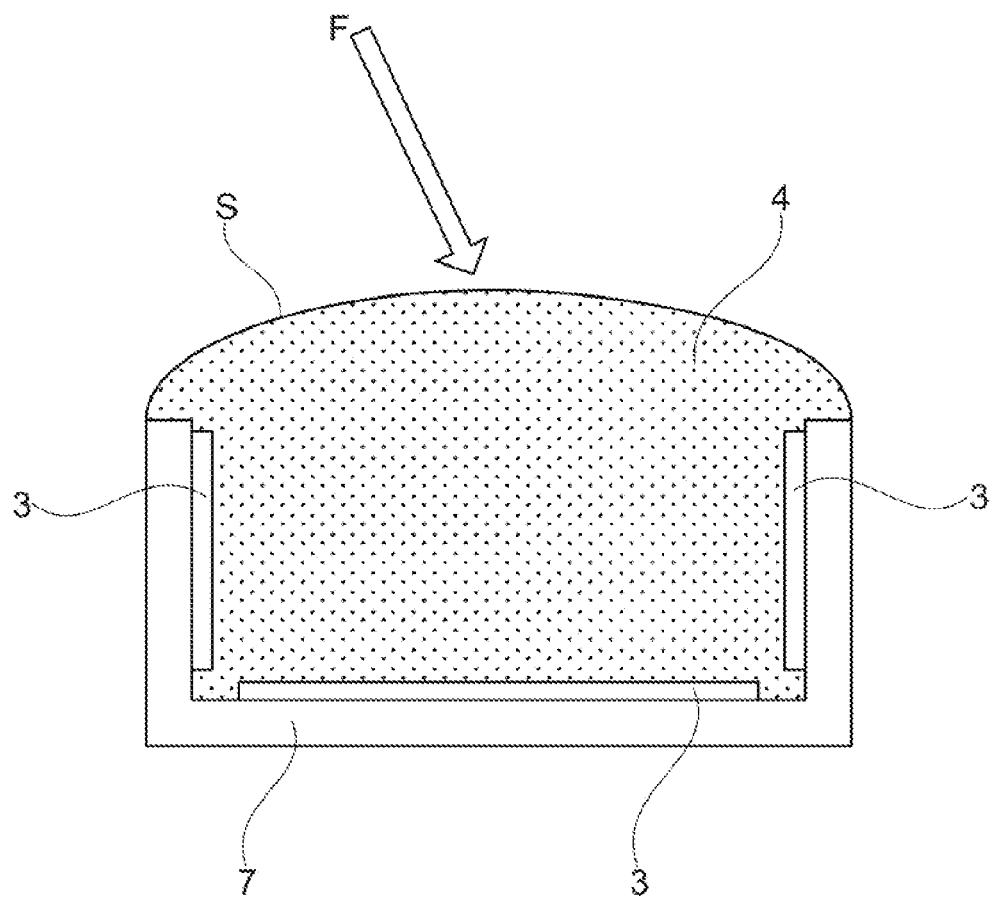
FIG. 2c illustrates a schematic and partial cross-section of an example of a sensor with the deformable medium extending outside of the cavity and defining a dome shaped detection surface.

The deformable medium 4 can fill the cavity 2 in various ways, and the detection surface can assume different shapes. For example, as illustrated in FIG. 2a, the deformable medium 4 fills the cavity 2 so as to be flush with the opening thereof. In an alternative embodiment, the deformable medium 4 protrudes out of the cavity 2, as illustrated in FIG. 2b. In the examples of FIGS. 2a and 2b, the detection surface S is a flat surface, parallel to the bottom surface 2a of the cavity. In another alternative embodiment, illustrated in FIG. 2c, the deformable medium 4 covers the opening of the cavity 2 with a variable thickness, with the covering being thicker at the center of the cavity 2, the detection surface S forming a dome above the cavity 2.

The detection structure 3 can be produced in various ways, some of which are shown in FIGS. 3a, 3b, 3c, 3c, 3e and 3f.

Figure 3A:
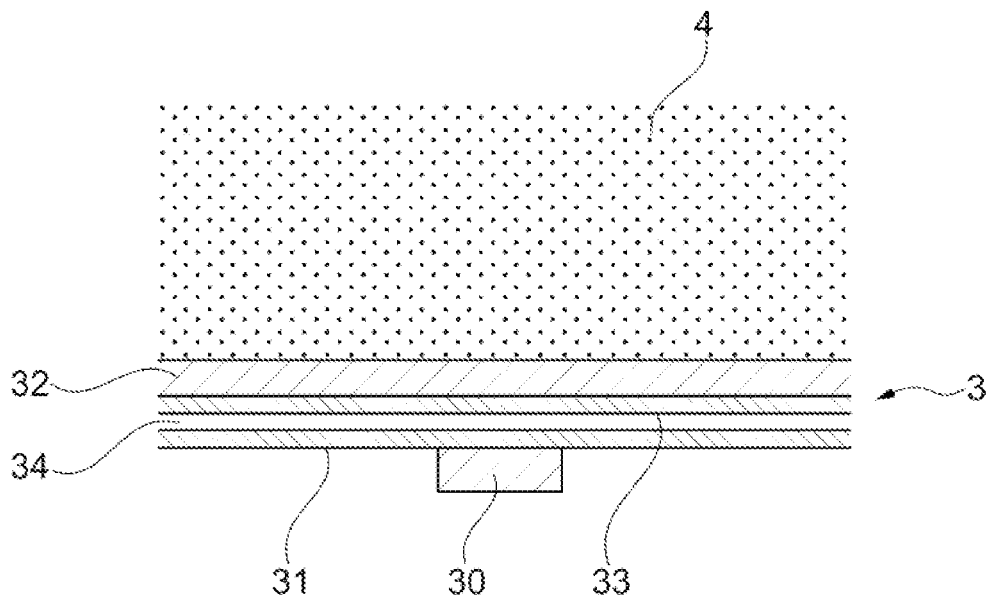
FIG. 3a shows a partial and schematic cross-section of an example of a detection structure comprising electrodes supported by two layers of material with low conductivity.

As illustrated in FIG. 3a, a first electrode 30 can be printed on a layer 31 of material with low conductivity, for example, a polymer filled with carbon particles, and a second electrode 32 can be printed on another layer 33 of material with low conductivity. The layers 31 and 33 are then overlaid so that the electrodes 30 and 32 are disposed on the outside of the assembly. The two layers 31 and 33 are separated, for example, by a very thin air gap 34, and only touch each other with satisfactory electrical contact when pressure is exerted on the assembly. In the considered example, the electrodes 30 and 32 are each linear shaped and are arranged perpendicular to each other. The electrode 32 is in contact with the deformable medium 4, whereas the electrode 30 is in contact with an underlying support (not shown herein). The forces transmitted by the deformable medium 4 when a force F is applied onto the detection surface S vary the contact surface between the layers 31 and 33. When a voltage is applied between the electrodes 30 and 32, the variation in the contact pressure between the layers 31 and 32 causes a change in the electrical resistance measured in the zones where the electrodes intersect (which correspond to the measurement points).

Figure 3B:
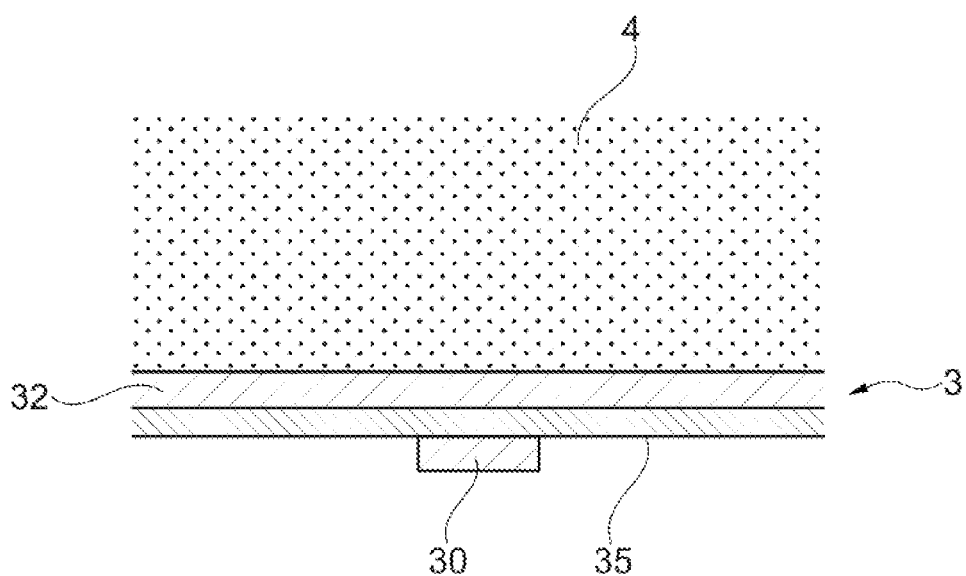
FIG. 3b shows a partial and schematic cross-section of another example of a detection structure comprising electrodes located on either side of the same layer of piezoresistive material.

In an alternative embodiment illustrated in FIG. 3b, the electrodes 30 and 32 are printed on either side of the same layer 35 of intrinsically piezo-resistive material, which deforms under the action of the forces transmitted by the deformable medium 4, causing, similarly to the previous example, a variation in the electrical resistivity in the intersection zones of the electrodes.

Figure 3C:
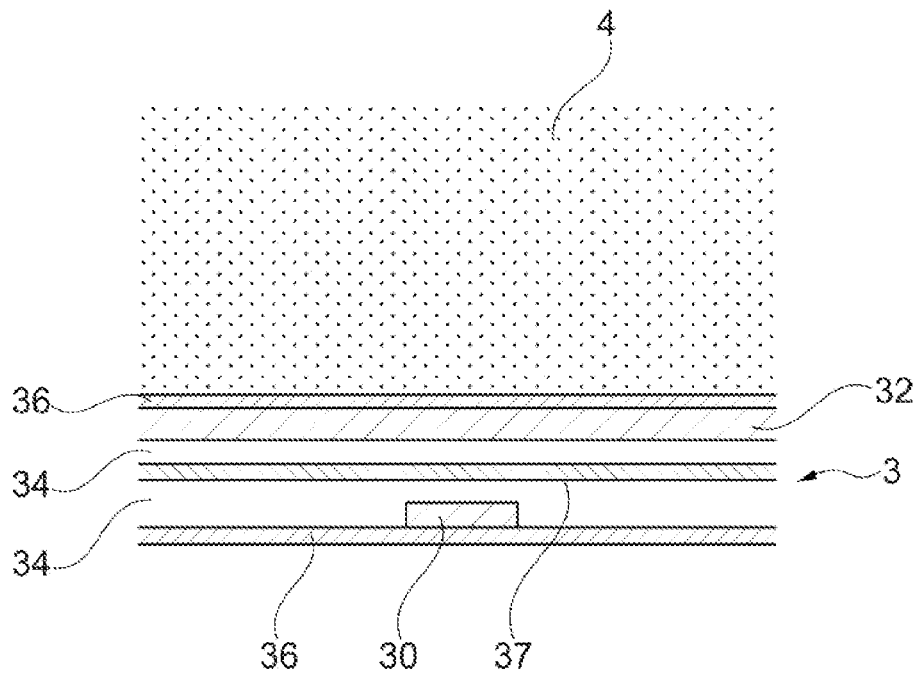
FIG. 3c shows a partial and schematic cross-section of another example of a detection structure comprising electrodes supported by two flexible layers and a layer of conductive polymer.

In other alternative embodiments, the electrodes are supported by a flexible substrate, for example PET. The electrodes 30 and 32 are, for example, each printed or deposited on a flexible electrically insulating layer 36 and face each other, as illustrated in FIG. 3c. A layer 37 with low conductivity, for example, a polymer, optionally cellular, or even a piezoelectric material, is sandwiched between the electrodes 30 and 32 and separated from each electrode 30 or 32 by a thin air gap 34.

Figure 3D:
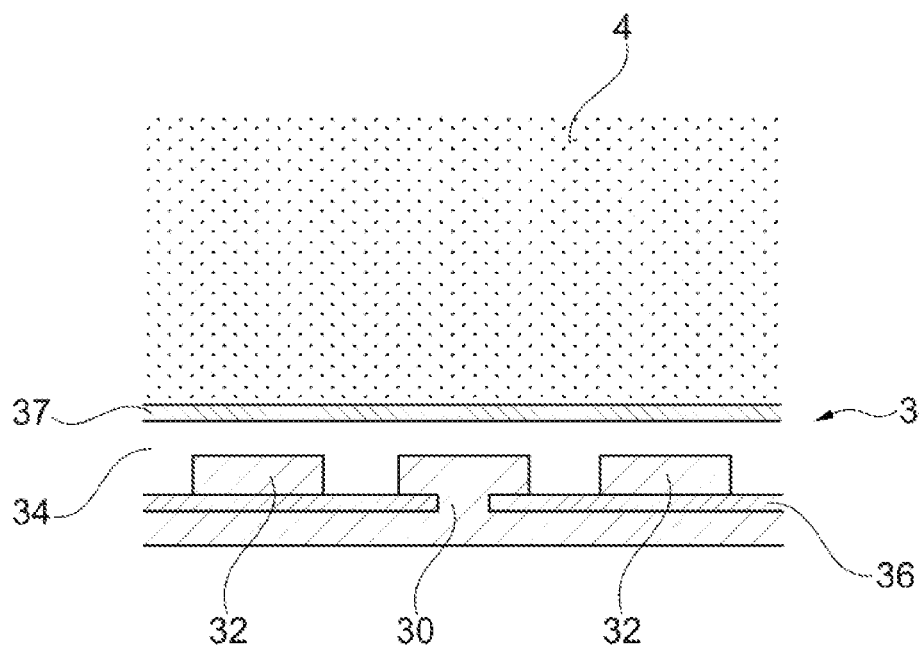
FIG. 3d shows a partial and schematic cross-section of another example of a detection structure comprising electrodes on the same face of a flexible layer and a conductive polymer layer.

In the alternative embodiment of FIG. 3d, the electrodes 30 and 32 are supported by a single electrically insulating substrate 36, facing a layer 37 with low conductivity, for example, a foam or a non-cellular material, in contact with the deformable medium 4. The electrodes are separated from the layer 37 by a thin air gap 34. When a force is transmitted by the deformable medium 4, the layer 37 can come into contact with part of the electrodes.

As previously explained, measuring the variation in the electrical resistance between two electrodes of such detection structures 3 allows the forces transmitted by the deformable medium to be estimated.

The pressure generated by the forces transmitted to the detection structures 3 can be measured with discrete sensors, if applicable.

Figure 3E:
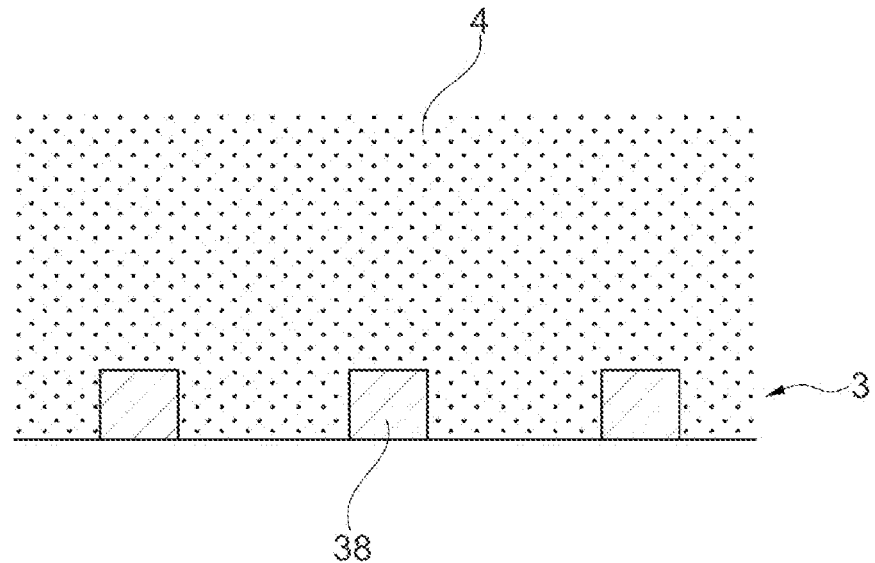
FIG. 3e shows a partial and schematic cross-section of another example of a detection structure comprising strain gauges protruding into the deformable medium.

In the example illustrated in FIG. 3e, the detection structure 3 comprises strain gauges 38, for example, of the metal type, disposed on the surface of the cavity and extending inside the deformable medium 4.

Figure 3F:
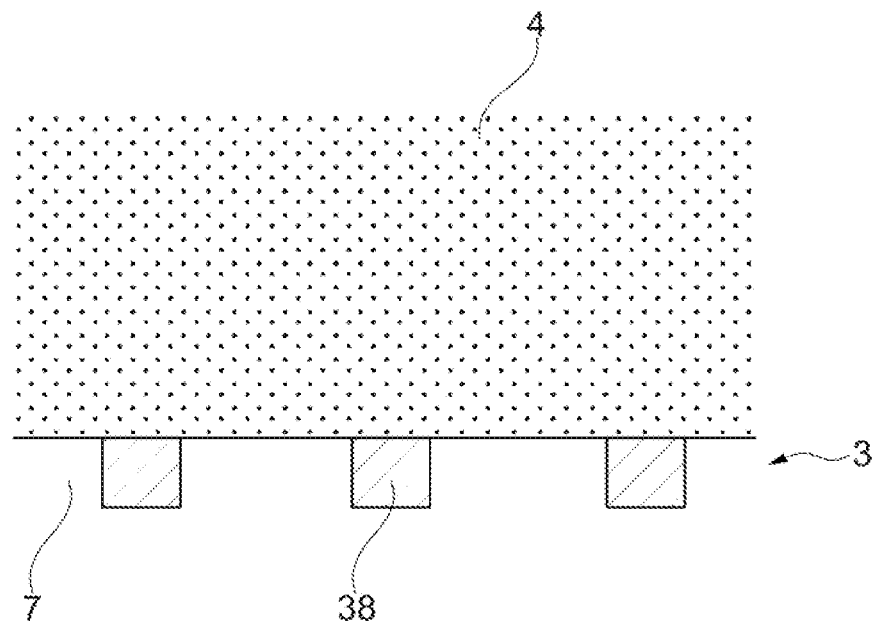
FIG. 3f shows a partial and schematic cross-section of another example of a detection structure comprising strain gauges partially integrated into the support and coming into contact with the deformable medium.

In the alternative embodiment illustrated in FIG. 3f, the strain gauges 38 are at least partially integrated into the support 7 and partially come into contact with the deformable medium 4. Other types of strain gauges still can be used, for example, Micro Electro-Mechanical System (MEMS) pressure sensors.

Figure 4:
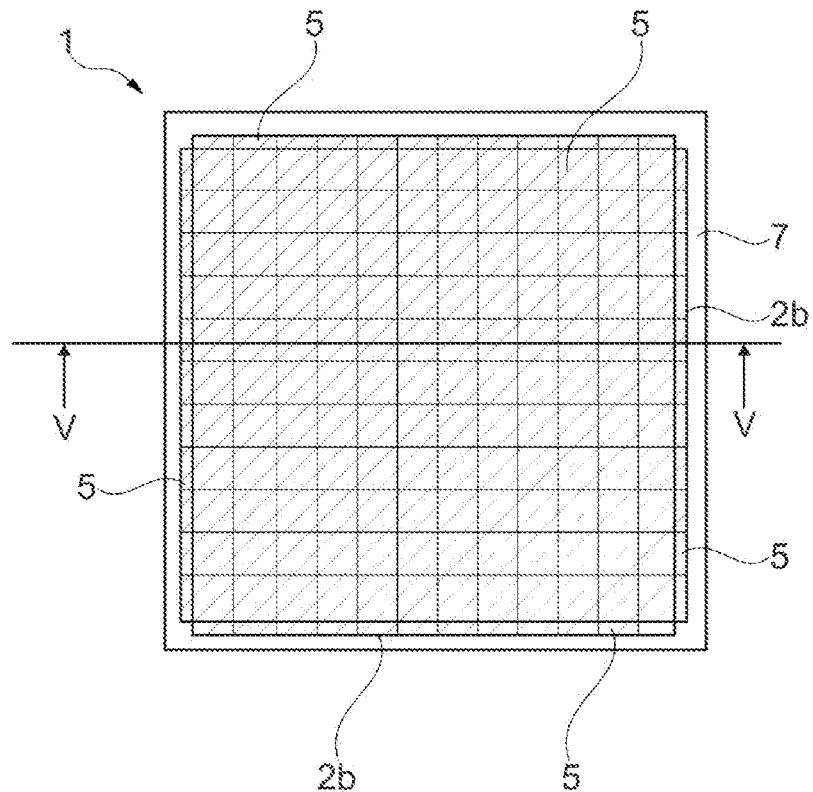
FIG. 4 is a front view of a sensor comprising multi-point detection structures defining multiple measurement zones.
Figure 5:
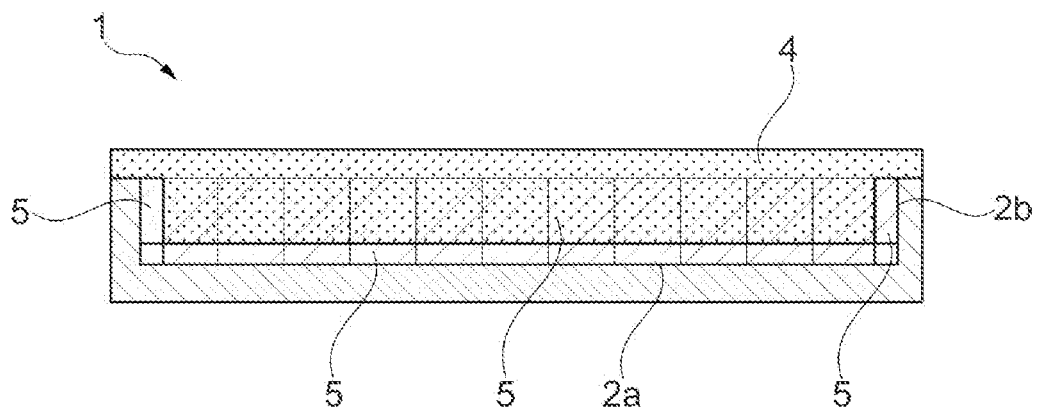
FIG. 5 shows a schematic and partial cross-section along V of FIG. 4 of the measurement zones present on the lateral faces of the sensor.

The detection structures 3 can be multi-point or single-point measurement structures. FIG. 4 illustrates the measurement zones 5 obtained on the surfaces of the cavity of a sensor comprising multi-point detection structures. In the considered example, the detection structure 3 disposed on the bottom surface 2a of the cavity 2 defines a grid of 12×12 measurement zones 5. On the side surfaces 2b, and as illustrated in FIG. 5, the detection structure 3 defines a row of measurement zones 5. The number and distribution of the measurement zones 5 on the detection structures 3 is, of course, not limited to the illustrated example, any arrangement can be contemplated, depending on the nature and the arrangement of the detection means equipping the detection structure.

Figure 6:
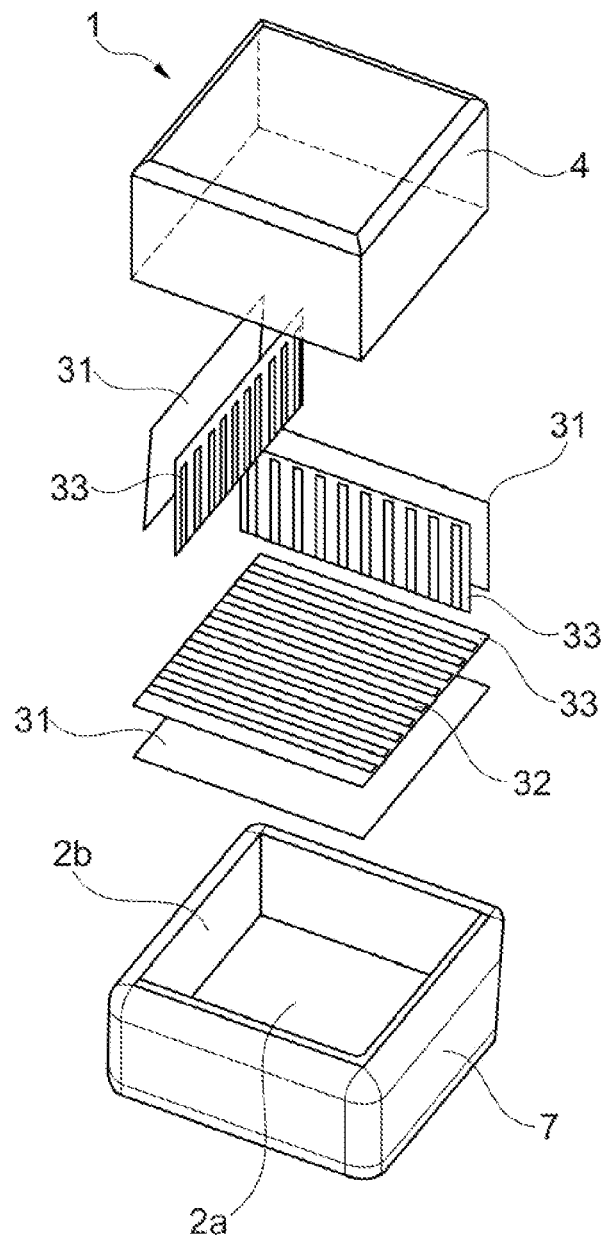
FIG. 6 is a schematic and partial perspective view showing an example of the integration of various constituent elements of the sensor.

In order to obtain the grid of measurement zones as described above, detection structures 3, such as those shown in FIG. 6, can be integrated on the surfaces 2a and 2b of the cavity 2. In this example, each detection structure 3 comprises, as described above, two layers 31 and 33 of material with low electrical conductivity, on which, for example, a plurality of linear electrodes, parallel to each other and evenly spaced apart, have been printed or screen printed. In FIG. 6, only the electrodes 32 of the layers 33 are visible. Electrodes 30 are disposed on the non-visible face of the layers 31 and are arranged, for example, perpendicular to those of the layer 33. The layers 31 and 33 disposed thus are integrated into the cavity 2 of the support 7. The deformable medium 4 is then added and comes into contact with the layers 33. The electrodes printed on the layer 33 of the side surfaces 2b of the cavity are vertical in the illustrated embodiment; however, any other orientation can be contemplated, for example, horizontal or oblique, the electrodes can assume a U-shape or V-shape, for example.

Figure 7:
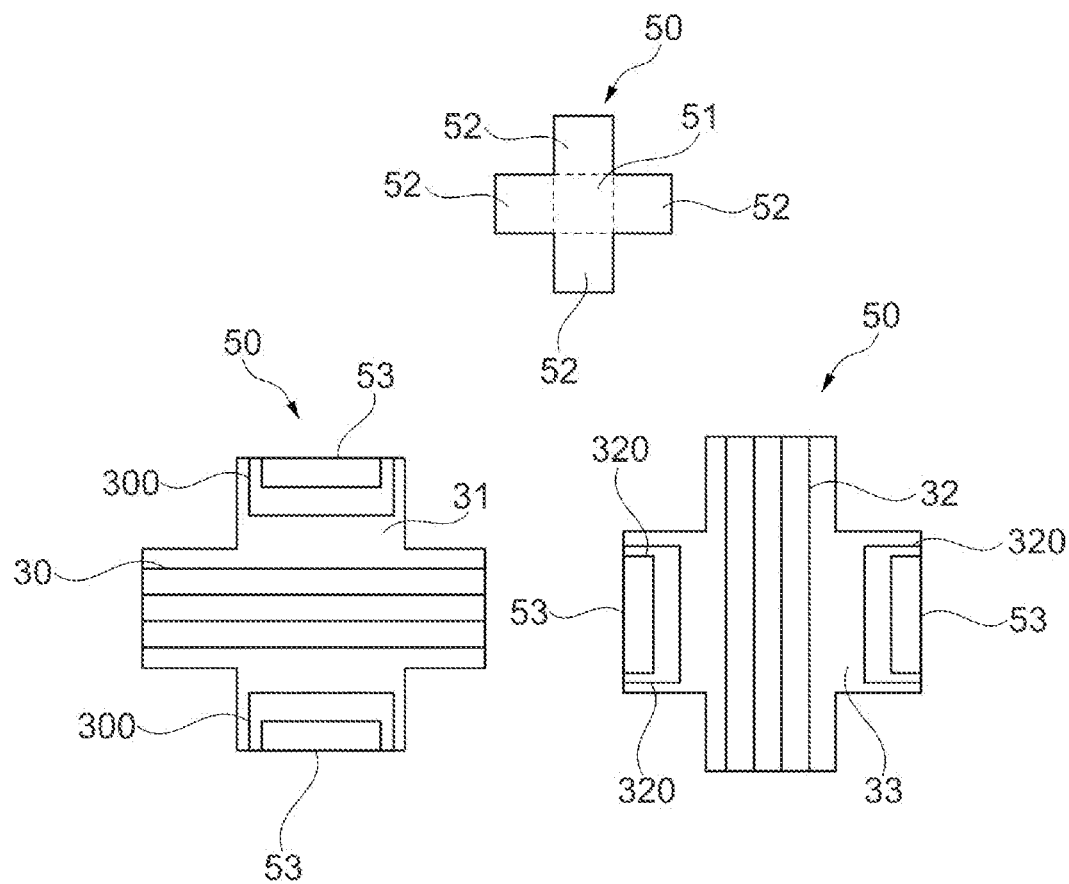
FIG. 7 is a partial and schematic front view of an example of two layers intended to be stacked and integrated into the cavity in order to form multi-point detection structures.

FIG. 7 illustrates another way of producing multi-point detection structures inside a cavity in the shape of a block. In this example, linearly shaped electrodes 30 and 32 are disposed on layers 31 and 33, respectively, of material with low conductivity, which will then be assembled together so that the electrodes 30 and 32 are located on the outside of the assembly.

The four-branch cross shape 50 of the layers 31 and 33 represents the flattened cubic cavity. All the electrodes are printed in the same plane and the assembly is then folded at a right angle to the central square 51 of the cross in order to be placed in the hollow support 7. Thus, the detection structures 3 of all the surfaces of the cavity 2 are integrated into the support as one piece, with the central square 51 of the cross forming the detection structure of the bottom surface 2a and the branches 52 of the cross each forming the detection structure 3 of a side surface 2b of the cavity. The arrangement of the electrodes is such that, on each detection structure, the electrodes 30 perpendicularly intersect the electrodes 32, with each intersection corresponding to a measurement zone 5. All the electrodes 30 and 32 emerge on the upper part of the cavity. On two opposite branches 52 of each layer, the electrodes are U-shaped, with branches 300 or 320 that extend up to the free edge 53 of the branch in order to facilitate electrical connection to a reading circuit.

Figure 8:
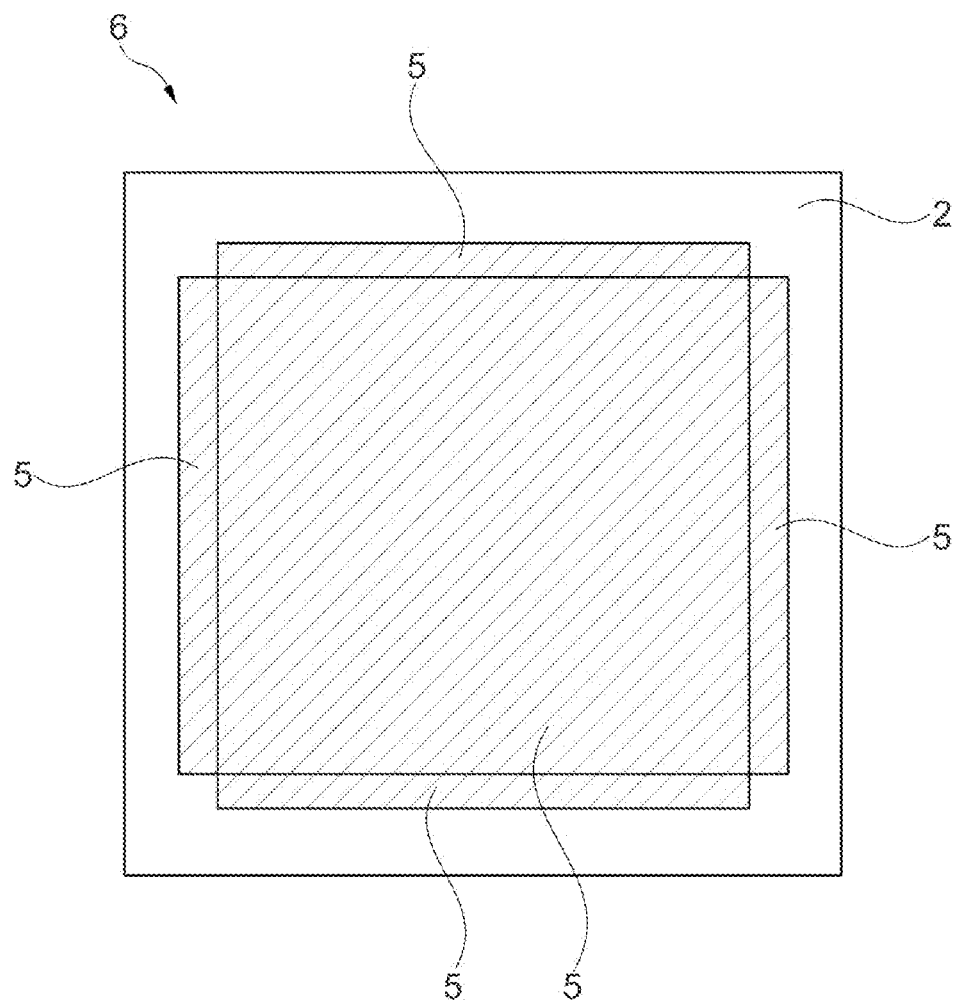
FIG. 8 is a partial and schematic top view of a single detection cell comprising single-point detection structures.
Figure 9:
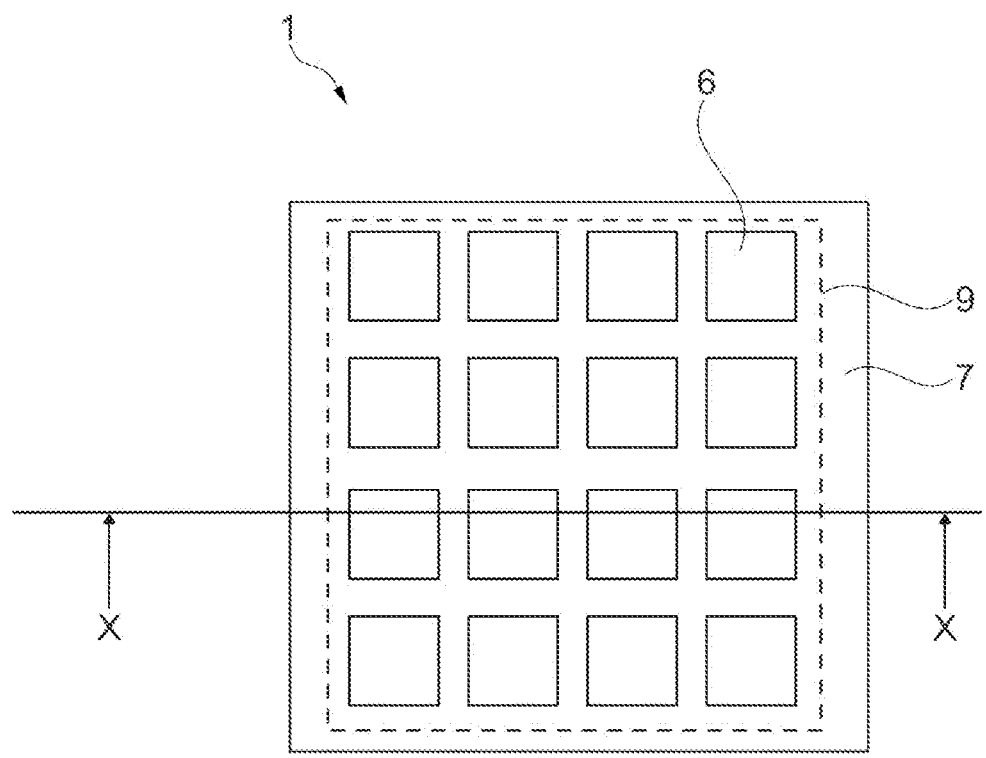
FIG. 9 is a schematic and partial top view of an example of a sensor with single detection cells.
Figure 10:
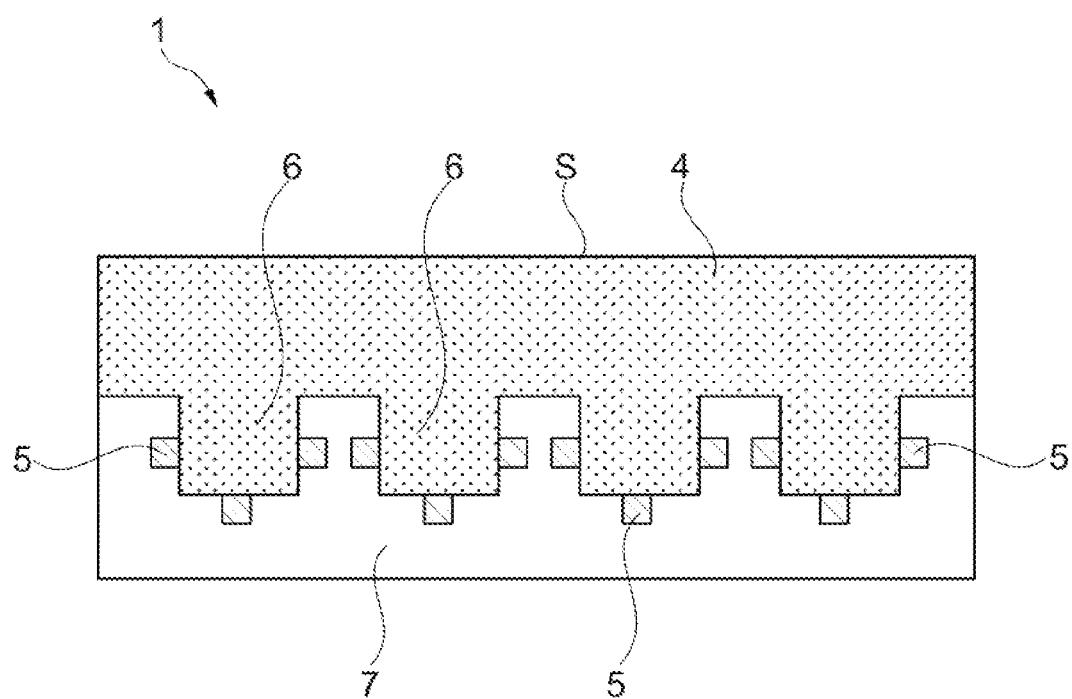
FIG. 10 is a schematic and partial cross-section along X of FIG. 9 of the sensor in this figure.
Figure 11:
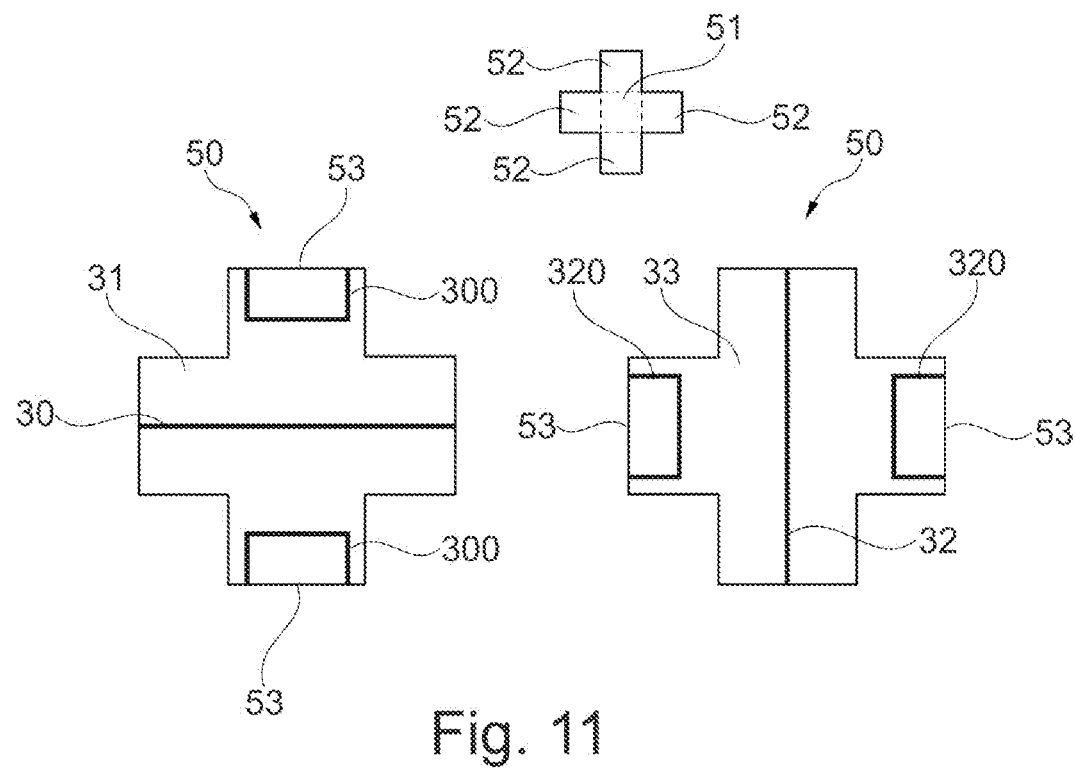
FIG. 11 is a schematic and partial top view of an example of two layers intended to be stacked on and integrated into a single cavity in order to form single-point detection structures.

In another embodiment, the sensor 1 comprises a plurality of single detection cells 6 only comprising single-point measurement detection structures 3. A single detection cell 6 comprises, for example, a single cubic cavity 2, as illustrated in FIG. 8, and has five separate measurement zones 5, that is one per detection structure 3. A matrix 9 of single detection cells 6 then can be formed, as illustrated in FIG. 9, by integrating the cavities on the same support 7, for example, on the same plane. The support is preferably rigid, and can be formed from a monolithic block, as in the considered example, or as an alternative embodiment it can be obtained by assembling separate elements. The deformable medium 4 of the sensor 1 thus obtained preferably forms a monolithic block, as shown in FIG. 10, defining a detection surface S common to all the assembled single detection cells 6. The advantage of such a sensor is that it is able to measure a continuous distribution of the forces exerted on the detection surface S. In particular, and unlike a single-cavity sensor, with a matrix 9 of single detection cells it is possible to distinguish the application of two distinct simultaneous forces.

A single detection cell 6 can be produced by integrating two layers 31 and 33 of material with low conductivity in the shape of a cross 50 into the cavity 2, similar to the previous description. In the considered example, in order to obtain single-point detection structures 3, for example, three electrodes 30 are printed on the layer 31, and three electrodes 32 are printed on the layer 33. The arrangement of the electrodes is such that, once the two layers as a whole are assembled in the cavity, an electrode 30 perpendicularly intersects an electrode 32 on each single detection structure 3, corresponding to the single measurement zone 5. As previously described, all the electrodes 30 and 32 emerge on the upper part of the cavity, and the electrodes located on two opposite branches 52 of the cross are U-shaped, with branches 300 or 320 that extend up to the free edge 53 of the branch.

As an alternative embodiment, the detection structures of a line of single detection cells 6 of a matrix 9 can be formed as a "strip" on the same substrate, in particular on a flat substrate. The strip is then folded in order to be integrated into the support 7 in a serrated shape that conforms to the series of cavities.

Figure 12:
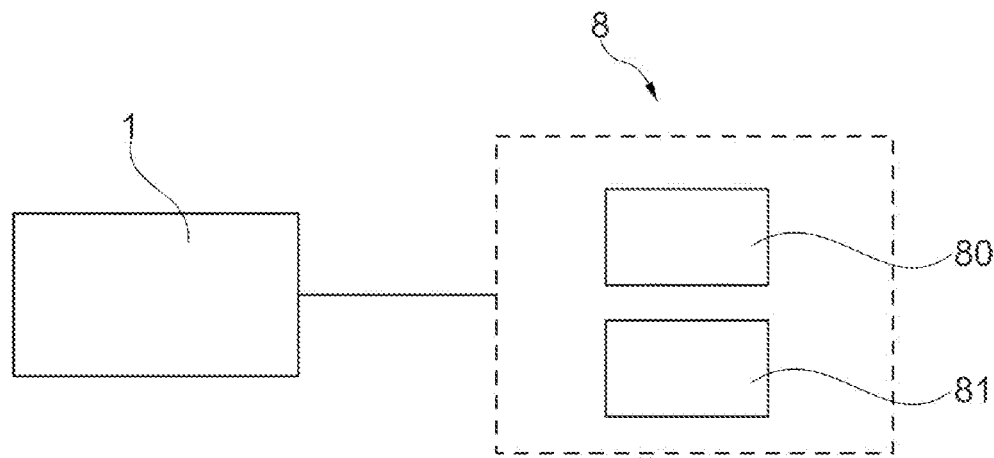
FIG. 12 shows a schematic and partial view of an example of a sensor according to the invention comprising a processing circuit.

The force sensor according to the invention preferably comprises, as illustrated in FIG. 12, a processing circuit 8 in order to process the signals delivered by the detection structures 3 in order to measure at least one, and preferably all, the components of a force exerted on the detection surface S. It comprises a central unit 80 and a memory 81, for example.

Figure 13:
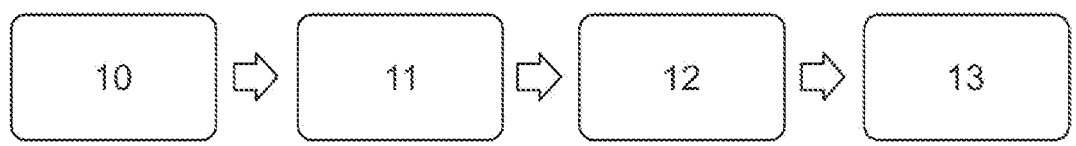
FIG. 13 is a block diagram illustrating an example of the operation of a force sensor according to the invention.

The components of the force exerted on the detection surface S can be determined on the basis of the processed signals by following, for example, the steps of the method that are shown in FIG. 13 and are described hereafter. By way of an example, a sensor is considered that comprises a cavity in the form of a block, as illustrated in FIG. 6, and that comprises a multi-point detection structure 3 on each of the surfaces of its cavity that defines a grid of measurement zones similar to that shown in FIG. 4. In the considered example, the measurement zones 5 are square shaped and all have an identical surface, as illustrated in FIG. 12.

In the first step 10, the voltage on each measurement zone 5 of each detection structure 3 is measured sequentially. For a detection structure, the voltage measured in the measurement zone (i, j) located at the intersection of row i with column j of the grid is denoted $v_{ij}$, with i and j being integers varying from 1 to the number of rows and columns of the grid, respectively. In step 11, the single pressure $p_{ij}$ exerted on the measurement zone (i, j) is estimated as a function of the measured voltage, using the following relation, for example:

$$p_{ij} = \kappa v_{ij}$$

with $\kappa$ being a conversion factor expressed as Newtons/(mm$^2$·volts), which depends on the materials that are used. A distribution of the pressures on the relevant detection structure is then advantageously obtained, the resolution of which can be below one millimeter, for example.

Figure 14:
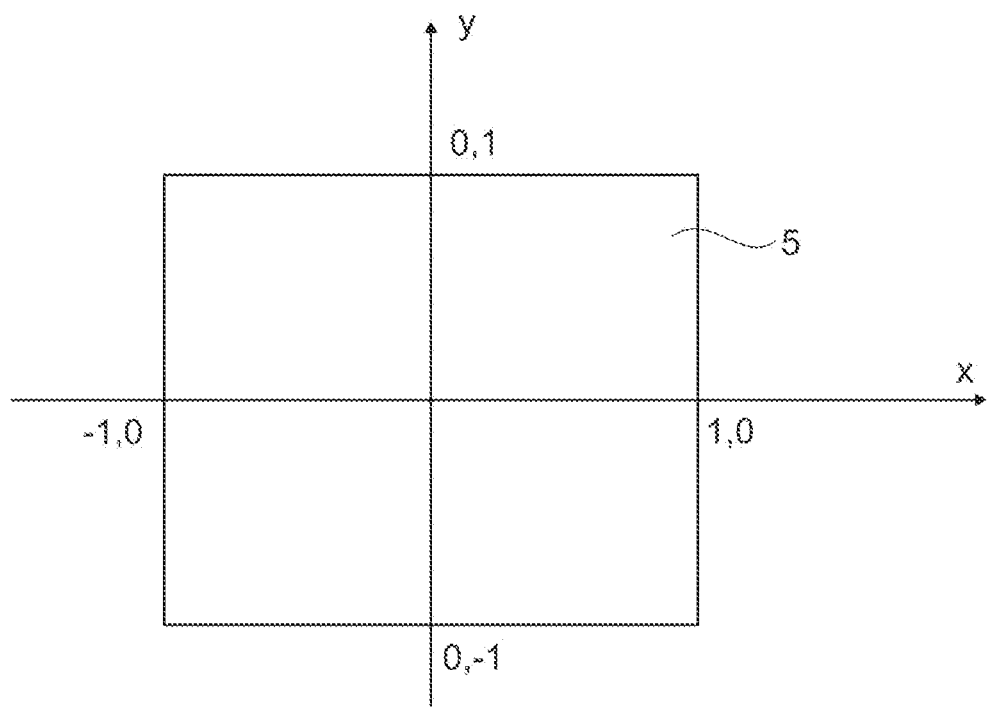
FIG. 14 schematically shows a single measurement zone of the detection structure over which pressure can be detected.

The resultant of the normal forces $F_N$ exerted on the detection structure 3 can be obtained by adding the corresponding pressures:

$$F_N = \Sigma\Sigma p_{ij} ds = \Sigma\Sigma a v_{ij} ds$$

with ds denoting the surface of the measurement zone 5, as shown in FIG. 14, in a standardized coordinate system, with ds being identical for all the measurement zones.

Figure 15:
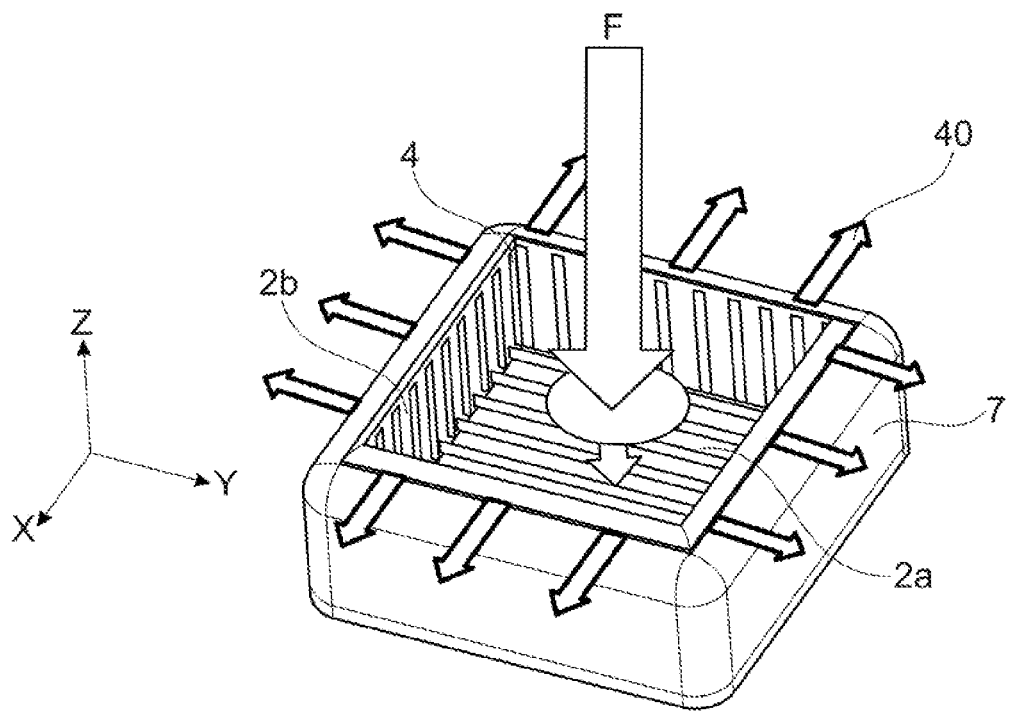
FIG. 15 is a partial and schematic perspective view of an example of a sensor according to the invention illustrating the forces transmitted to the detection structures when a normal force is exerted on its detection surface.

In step 12, for example, the three components of the force F exerted on the detection surface S of the sensor 1 are computed. In view of the geometry of the sensor in the considered example, the following description is based on a Cartesian coordinate system with directions (X, Y, Z), with Z denoting a direction normal to the detection surface S and to the surface of the bottom of the cavity, and X and Y denoting the tangential directions, as illustrated in FIG. 15. The normal component $F_z$ of the force F, i.e. the force in the direction Z, is simply provided by the resultant of the normal forces $F_N$ exerted on the detection structure of the bottom of the cavity 2a.

Figure 16A:
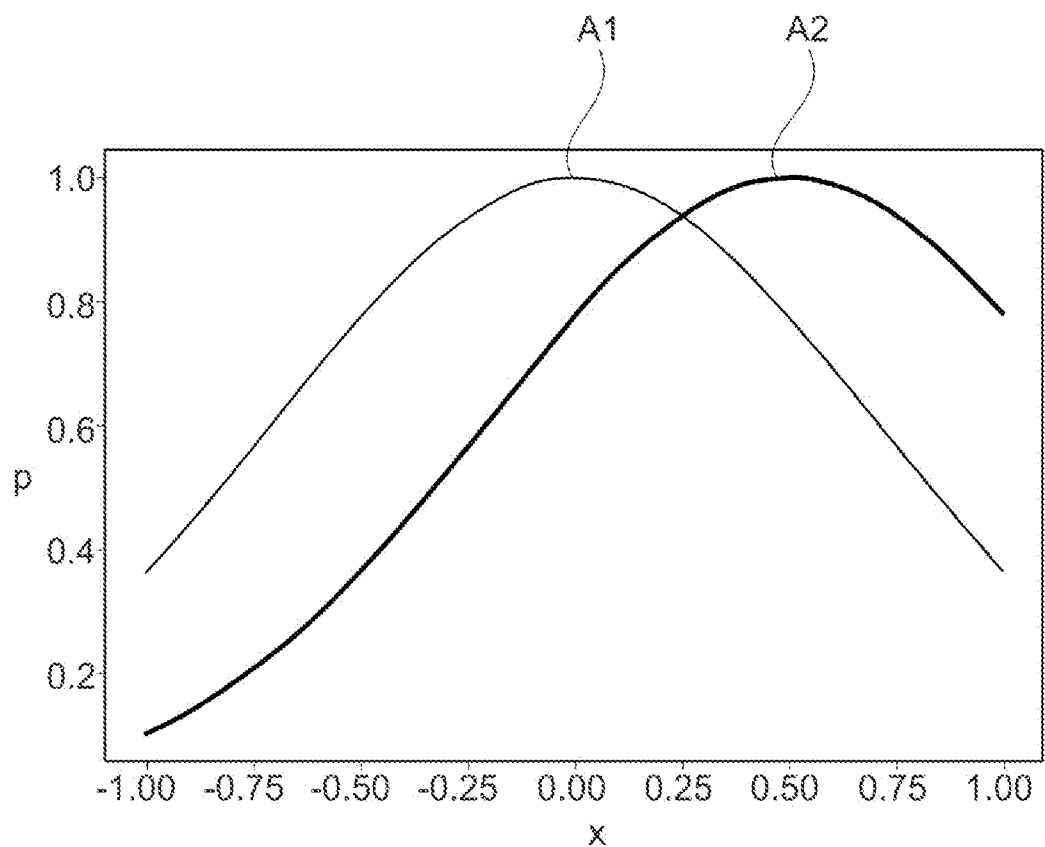
FIG. 16a is a graph illustrating the elasticity properties of an example of a deformable medium.
Figure 16B:
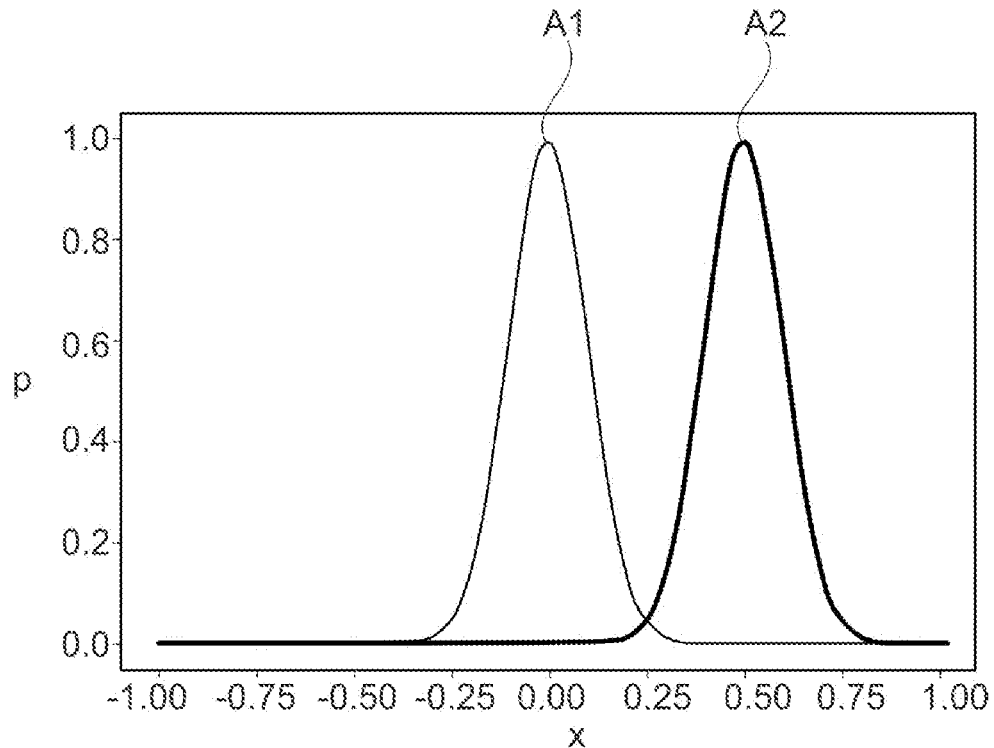
FIG. 16b is a graph illustrating the elasticity properties of another example of a deformable medium.

Depending on the nature of the deformable medium 4, a force exerted on the sensor in a normal direction, i.e. in the considered example in the direction Z, can lead to forces 40 transmitted in all directions, and in particular can cause non-zero pressure measurements on the lateral detection structures. This phenomenon, illustrated in FIG. 15, must be taken into account when computing the tangential components $F_x$ and $F_y$ of the force F. These tangential pressure measurements can be estimated and then compensated by modelling the response of the deformable medium 4 to a normal force, for example, in accordance with a Gaussian type model. Examples of such modelling are shown in FIGS. 16a and 16b. The example is provided in the direction X, but the reasoning is similar for the direction Y in view of the symmetry of the problem. In the considered example, the deformable medium 4 is subjected to two normal forces exerted at separate positions A1 and A2, corresponding to the maximum of the curves shown in FIGS. 16a and 16b. The tangential force $F_t$ transmitted by the normal force at the point x depends on the normal force $F_N$ exerted in accordance with the following relation, for example:

$$F_t(x, F_N, B_x) = \alpha F_N e^{\frac{-(x-B_x)}{2\sigma^2}}$$

with $B_x$ denoting the component x of the barycenter of the normal forces on the surface α and σ and a being two parameters that depend on the properties of the deformable medium 4 and on the dimensions of the sensor. A relatively low value of σ, as illustrated in FIG. 16b, implies that the transmission of the normal force in the tangential directions is limited. Conversely, a relatively high value of σ, as in FIG. 16a, implies that the transmission of the normal force in the tangential directions is high and that the corresponding measurements must be compensated.

Figure 17:
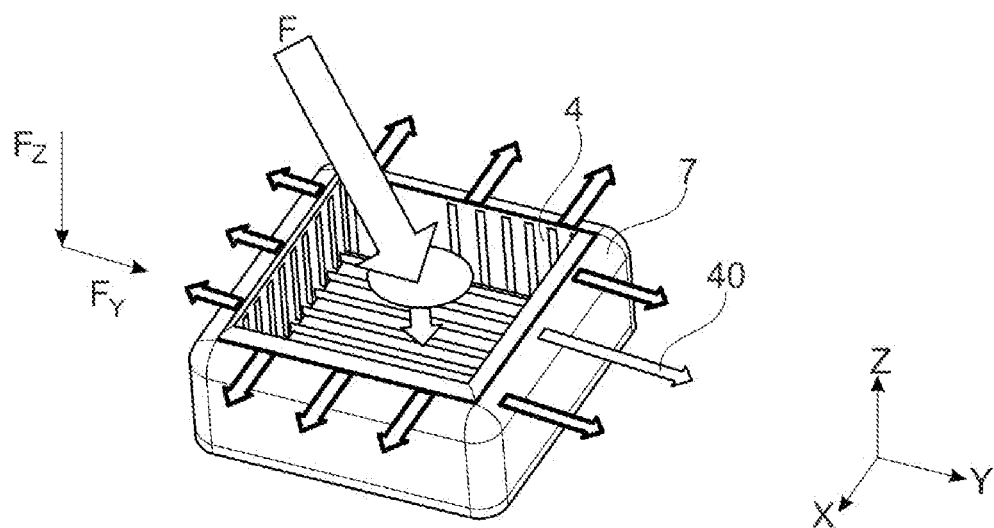
FIG. 17 is a partial and schematic perspective view of an example of a sensor according to the invention, illustrating the forces transmitted to the detection structures when any force is exerted on the detection surface.

In order to obtain the tangential component $F_x$ of any force F exerted on the detection surface S, as shown in FIG. 17, the previously described compensations are taken into account using the following relation, for example:

$$F_x = \beta[(F_R - F_t(1, F_N, B_x)) - (F_L - F_t(-1, F_N, B_x))]$$

with $F_R$ and $F_L$ being the resultant of the measured forces 40 on the detection structures of the lateral surfaces located at x=1 and x=−1, respectively. β is a parameter that depends on the nature of the deformable medium and on the dimensions of the sensor. If the force exerted on the detection surface S is normal to the bottom surface of the cavity and is centered, as illustrated in FIG. 15, the forces 40 measured on the 2 opposite lateral surfaces of the sensor are similar. Otherwise, as illustrated in FIG. 17, the forces 40 are greater on one side surface than on the other, allowing the direction of the force F to be determined in the corresponding direction.

The tangential component $F_y$ can be computed using a similar method.

Figure 18A:
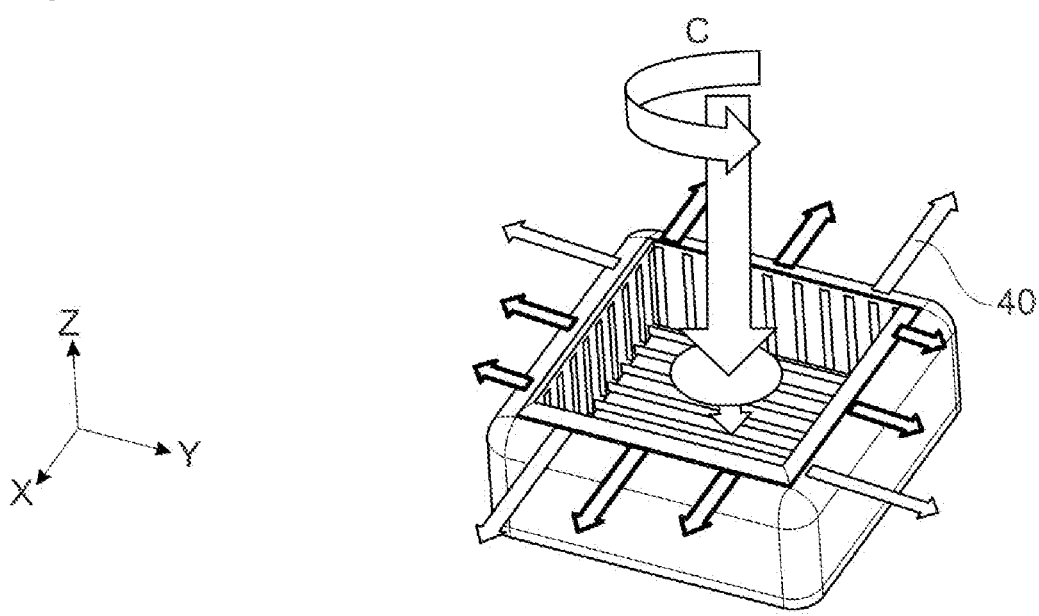
FIG. 18a is a partial and schematic perspective view of an example of a sensor illustrating the forces transmitted to the detection structures when a positive moment normal force is exerted on the detection surface.
Figure 18B:
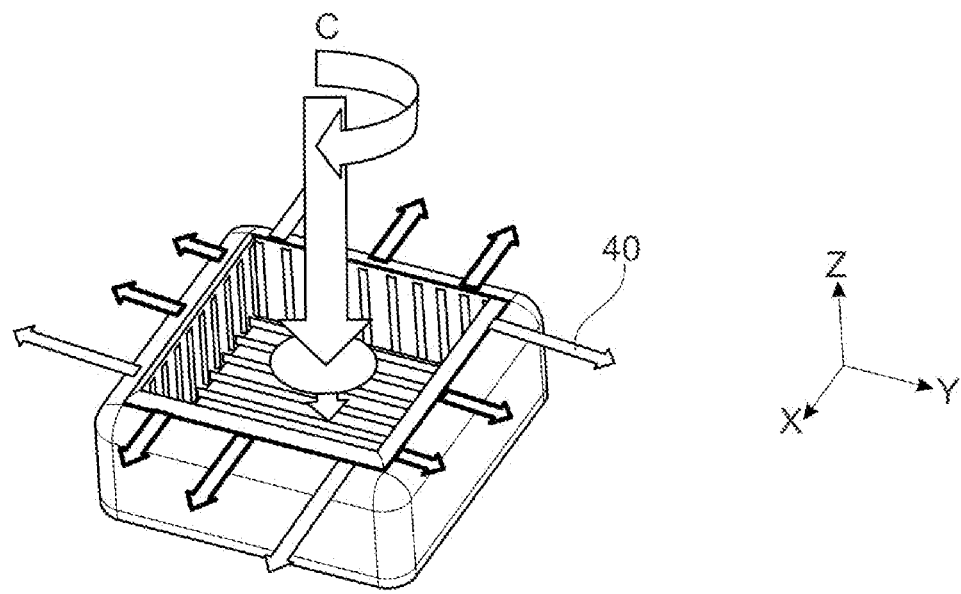
FIG. 18b is a partial and schematic perspective view of an example of a sensor illustrating the forces transmitted to the detection structures when a negative moment normal force is exerted on the detection surface.

If desired, the moment C of the force F exerted on the sensor 1 can be determined in step 13 on the basis of distributions of pressure detected by detection structures on opposite surfaces of the cavity. By way of an example, FIG. 18a shows the distribution of the forces 40 exerted on the side surfaces of the cavity when a positive moment normal force is applied at the center of the sensor, and, similarly, FIG. 18b shows the distribution of the forces 40 when a positive moment force is applied at the same point. The moment $Q_N$ is obtained by virtue of the following relation:

$$Q_N = \gamma(\nabla l + \nabla r + \nabla u + \nabla d)$$

with ∇l,∇r, ∇u,∇d being the gradients of the forces 40 measured on each of the side surfaces of the cavity of the sensor. γ is a factor depending on the nature of the deformable medium 4 and on the dimensions of the sensor.

The set of parameters (α,β,σ,γ) can be determined during a calibration phase, during which the sensor is subjected to known stresses, which are compared with the measured forces. The calibration can be carried out in several ways. For example, a model, such as a linear or non-linear regression model, can be used in order to find the parameters that minimize an error criterion between the measurement and the model, with the error criterion being selected, for example, in accordance with the known Mean Square Error (MSE), Root Mean Square Error (RMSE), Mean Absolute Error (MAE), or other methods.

Figure 19:
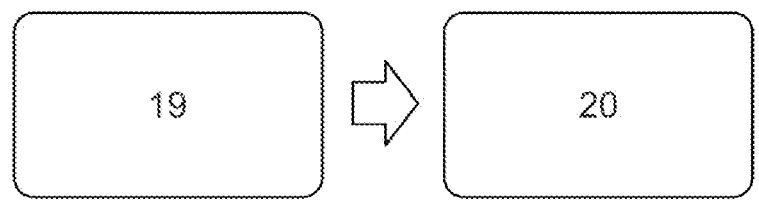
FIG. 19 is a block diagram illustrating some details of a method for calibrating a sensor according to the invention.

The method for determining the components of a force exerted on the sensor is not limited to the model described above, in particular if the detection surface of the sensor has a relatively complex shape. For example, a pre-trained neural network can be used to obtain the force applied onto the detection surface and determined as a function of the signals detected by the detection structures. If applicable, the neural network is trained beforehand during a calibration phase, as shown in step 19 of FIG. 19, in which, similar to the previously described model, the forces exerted on the detection structures are measured when the sensor is subjected to known stresses, in order to provide the neural network with examples for the training thereof. Once the neural network has been trained for a given sensor, it can be used in step 20 to determine all kinds of forces exerted on its detection surface. In addition to the neural network, other machine learning algorithms can be used, such as, for example, Support Vector Machine (SVR), GradientBoosting, or even Random forest methods.

Figure 20:
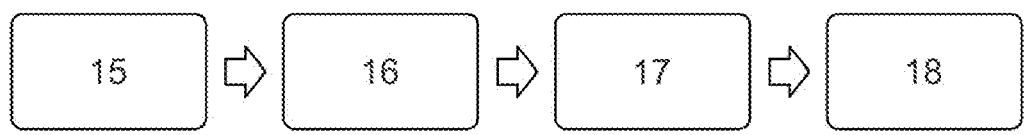
FIG. 20 is a block diagram illustrating an example of the operation of a sensor comprising a matrix of single detection cells.
Figure 21:
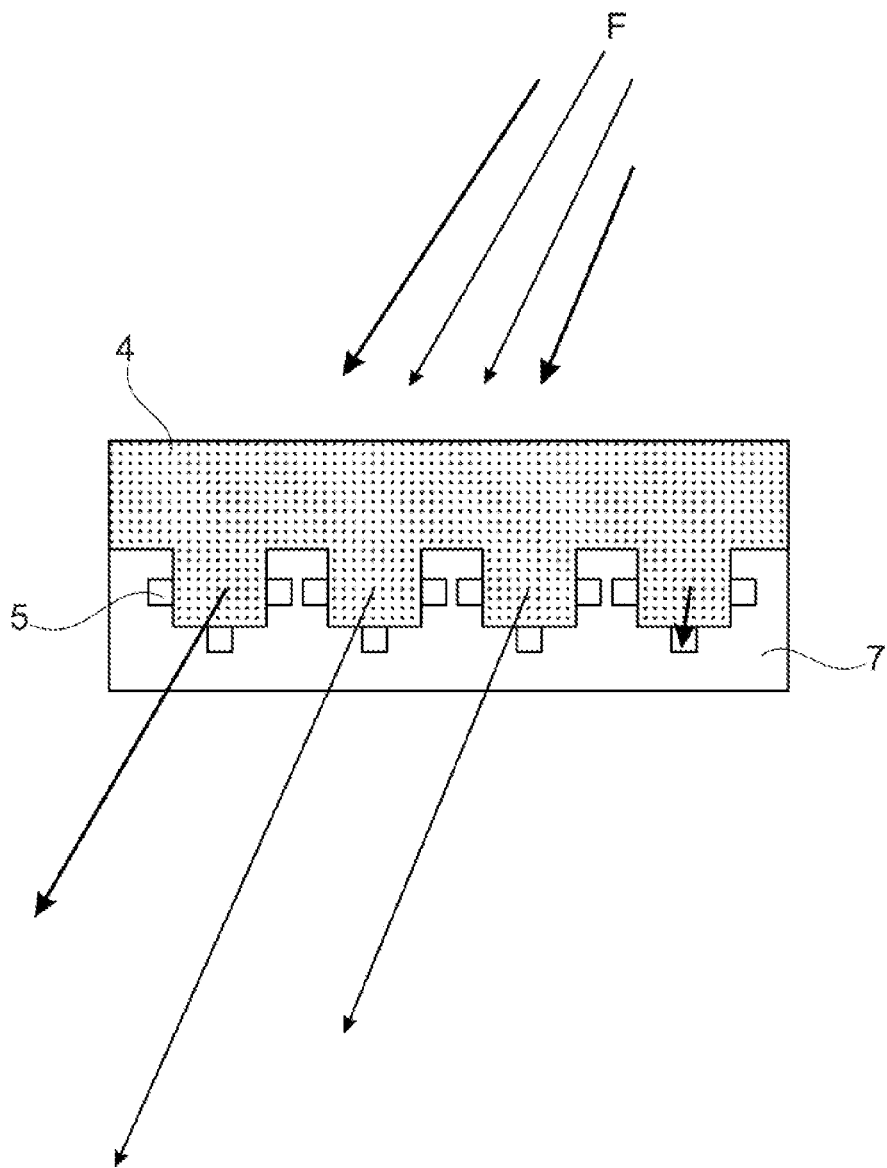
FIG. 21 is a schematic and partial cross-section, along X of FIG. 9, of the matrix of single detection cells, illustrating the possibility of measuring the distribution of a force exerted on the detection surface.
Figure 22:
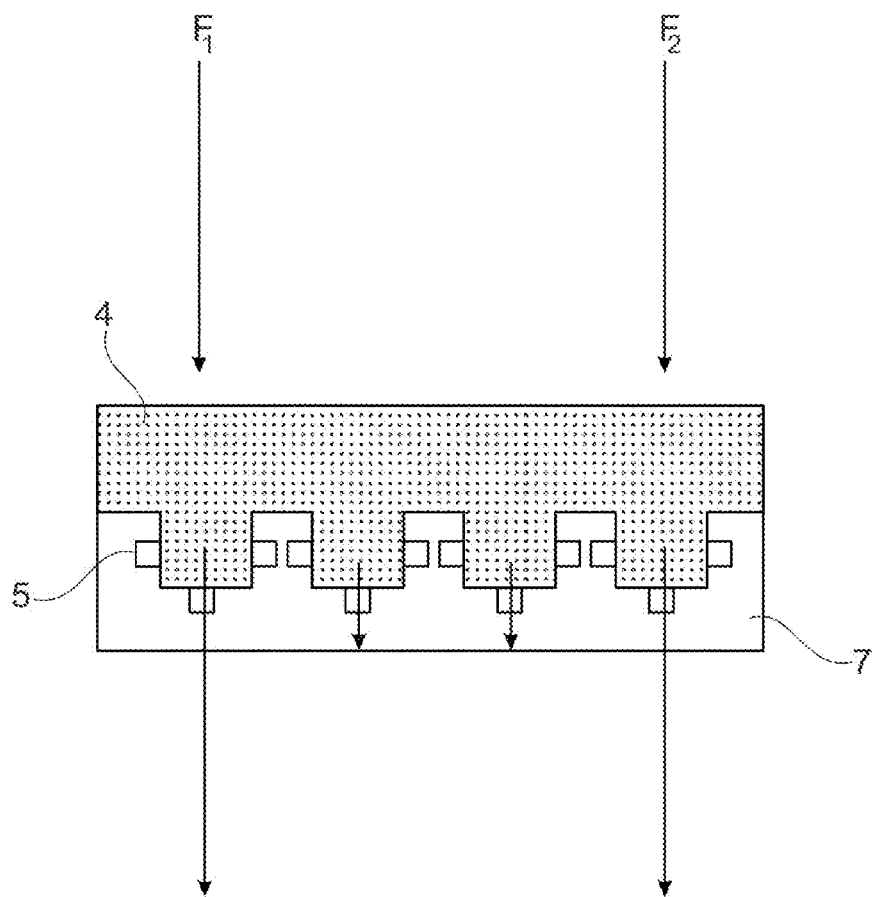
FIG. 22 is a schematic and partial cross-section, along X of FIG. 9, of the matrix of single detection cells, illustrating the possibility of detecting two separate forces on the detection surface.
Figure 23:
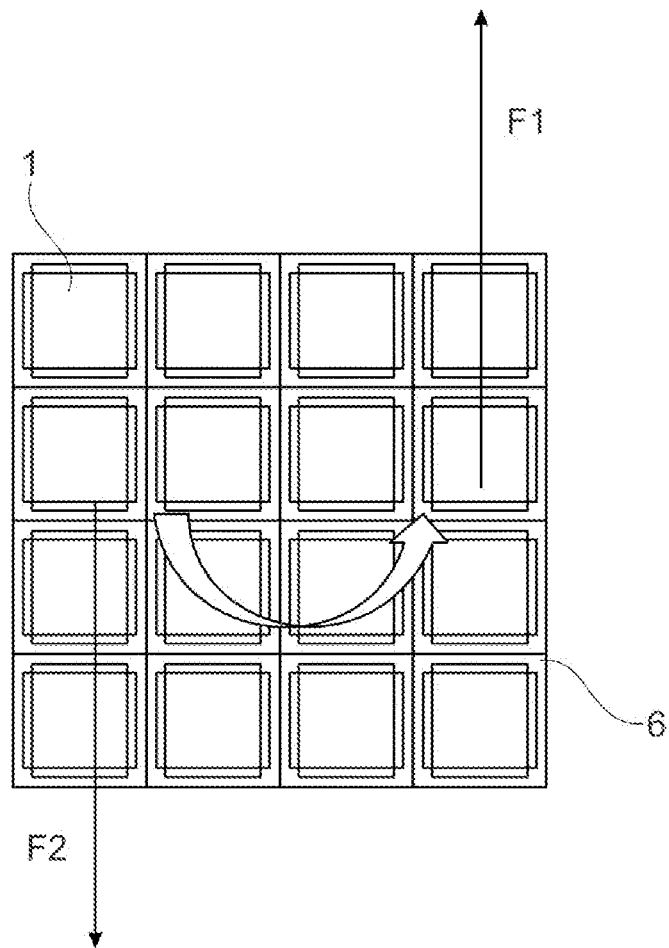
FIG. 23 is a schematic and partial cross-section, along X of FIG. 9, of the matrix of single detection cells, illustrating the possibility of measuring the moment of a force exerted on the detection surface.

In the case of a sensor comprising a matrix 9 of single detection cells 6, a single processing circuit 8 can process, for example, all the signals of the matrix 9 in order to compute, for example, the distribution of the one or more force(s) exerted on the detection surface S of the device, and/or the moment corresponding to said forces. This method is illustrated in FIG. 20. In step 15, and similar to the previous description, the voltage on the single measurement zone 5 of each detection structure 3 is measured for each detection cell 6. In step 16, the pressure exerted on the detection structure 5 is estimated as a function of the measured voltage and the components of the force exerted on the single detection cells 6 are computed in accordance with the same method as previously described, with or without compensation of the tangential pressures due to a normal force. In step 17, a distribution of forces over the entire matrix 9 is advantageously obtained on the basis of the computed forces, which can provide new information relating to the nature of the forces exerted on the sensor. In particular, it is possible to detect and quantify a "multi-layer" contact, i.e. the simultaneous application of at least two separate forces, as illustrated in FIG. 22. In step 18, and as illustrated in FIG. 23, the moment $\vec{Q}_t$ of a force exerted on the sensor comprising the matrix 9 of single detection cells 6 can be computed on the basis of the estimated forces $\vec{F}_i$ for each single detection cell 6 and on the following relation:

$$\vec{Q}_t = \Sigma \vec{r}_i \times \vec{F}_i$$

where the number of single sensors is added and the vector $\vec{r}_i$ denotes the position vector between the center of the single sensor cell i and the point relative to which the moment is computed, i.e. the point of application of the total force.

Figure 24:
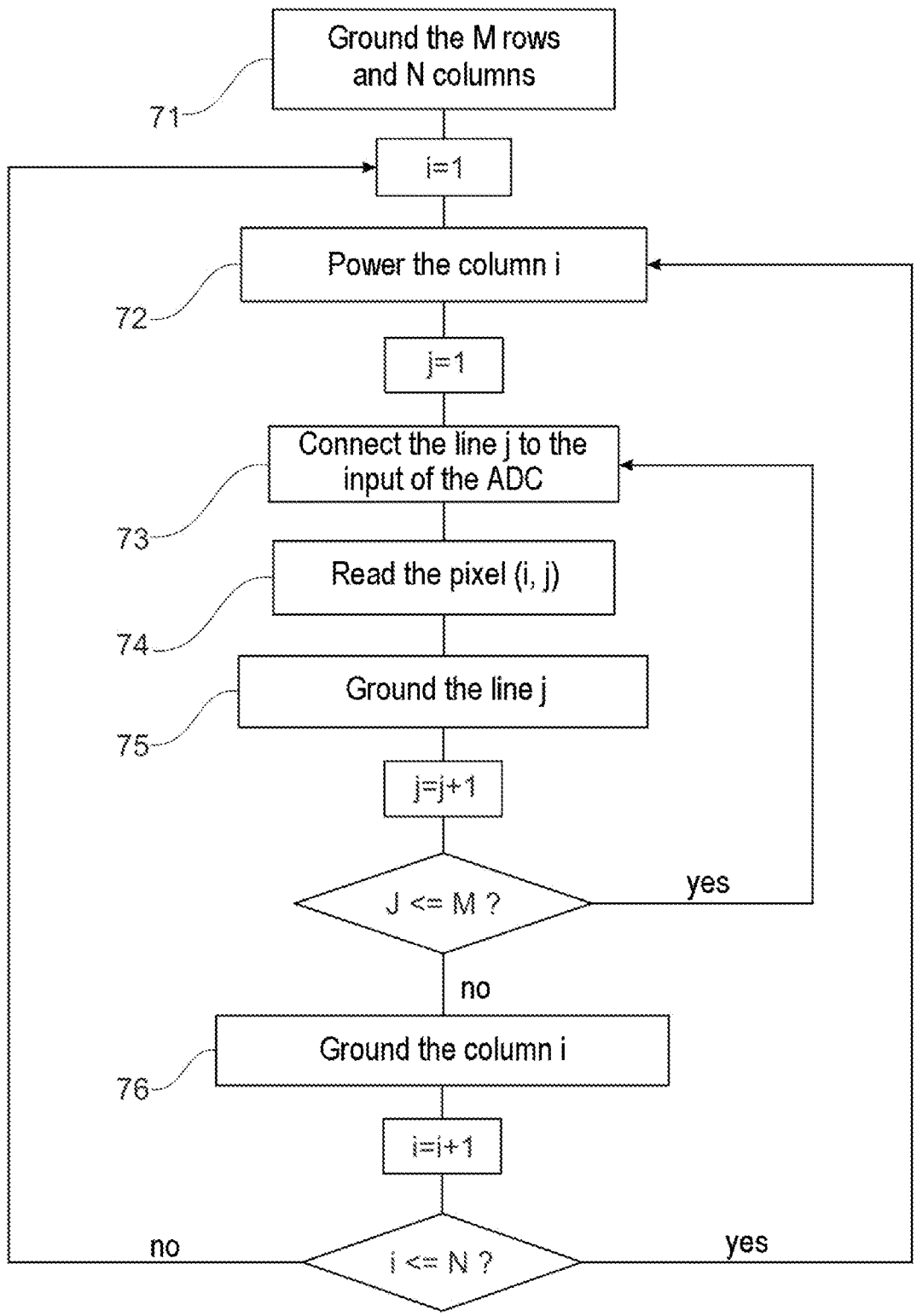
FIG. 24 is a block diagram illustrating an example of a method for reading the measurement points of a multi-point detection structure.

When the sensor comprises multi-point detection structures 3 with a matrix arrangement of electrodes resulting in a grid of measurement zones, as illustrated in FIG. 4, for example, a method for reading measurement zones 5 by scanning, such as that shown in FIG. 24, can be implemented. This method, which is described hereafter, uses a method similar to that proposed in the article entitled "The UnMousePad—An Interpolating Multi-Touch Force-Sensing Input Pad" by Rosenberg et. Al (*ACM SIGGRAPH* 2009 papers. 2009. 1-9).

In the considered example, N denotes the number of electrodes disposed on a face of the detection structure 3, that is the number of columns in the grid, M denotes the number of electrodes disposed on the opposite face of the detection structure 3, that is the number of rows in the grid. As previously described, the intersection of the electrodes defines the measurement zones 5. In the first step 71 of the reading method, all the electrodes are grounded. The following steps are then repeated for i, which is an integer ranging between 1 and N:
  in step 72, powering the electrode i; and
  repeating, with j being an integer between 1 and M:
    in step 73, the electrode j is connected to the input of a reading circuit;
    in step 74, the signal is read on the measurement zone corresponding to the intersection of the electrodes i and j; and
    in step 75, the electrode j is grounded; and
  the electrode i is grounded.

Figure 25:
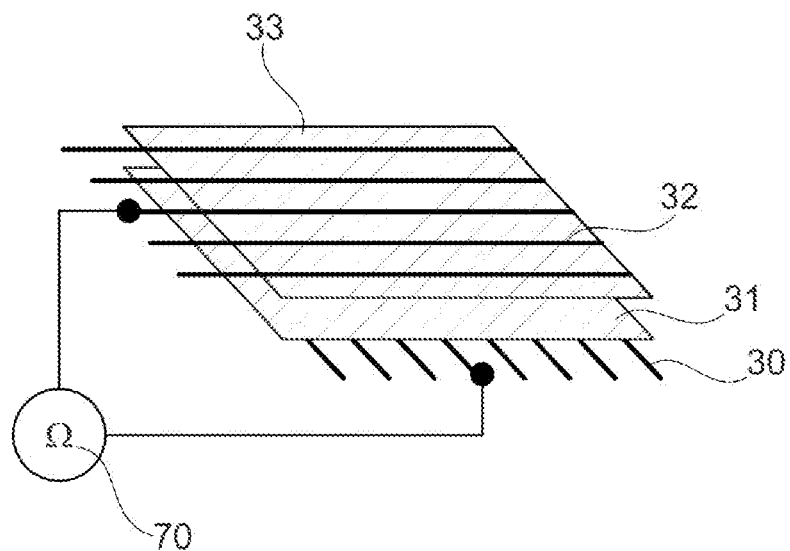
FIG. 25 schematically and partially shows an example of the electrical resistance between the electrodes according to the method of FIG. 24.

This sequential reading method, by supplying each of the measurement zones 5 in turn, as illustrated in FIG. 25, while connecting the other electrodes to ground (not shown in FIG. 25), advantageously allows measurement artefacts, such as "ghost" signals, to be limited that are associated with the leakage paths of the current inside the detection structure. The electronic components, by virtue of the multiplexing of the channels, also can be pooled, which can reduce the manufacturing cost of the sensor. As an alternative embodiment, a plurality of analogue-digital converters can be used with or without channel multiplexing, in particular one converter per electrode j connected to the reading circuit.

Figure 26:
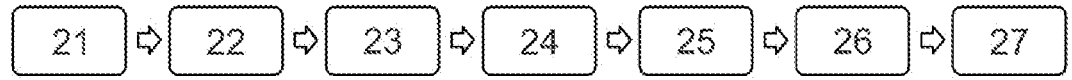
FIG. 26 is a block diagram illustrating an example of a method for manufacturing a sensor according to the invention.

A sensor according to the invention can be manufactured by following, for example, the steps of the method illustrated in FIG. 26. In step 21, at least one first electrode 30 assuming a linear shape, for example, is printed on a first layer 31 of material with low conductivity. In step 22, at least one second electrode 32, in particular similar to the first electrode, is printed on a second layer 33 of material with low conductivity. In step 23, the layers 31 and 33 are assembled so that the electrodes 30 and 32 are on the outer faces of the assembly and so that the electrode 32 intersects, in a front view, the electrode 30. In step 23, the assembly that is obtained is then cut into a shape corresponding to the pattern of the cavity 2, before being integrated into the support 7 in step 24, with a detection structure 3 thus being located on each surface of the cavity. In step 25, the cavity is at least partially filled with a resiliently deformable material, in particular an elastomer, and each electrode of the sensor thus obtained is electrically connected in step 26, which step can occur before step 25, if applicable.

Of course, the invention is not limited to the examples described above.

For example, the detection of the pressures exerted on the detection structures 3 is not necessarily obtained by resistive measurement. It can be achieved, for example, by capacitive measurement, for example, by replacing the conductive material with a material with a high dielectric constant, and by subjecting the measurement electrodes to alternating voltages, for example, or by any other method suitable for measuring a capacitance.

The cavity can assume any shape, and any depth as required. For example, it can be very shallow. The dimensions of the corresponding sensor can vary from a few millimeters to a few centimeters by width and by length, for example, and the thickness is a few millimeters, for example.

The sensor also can be equipped to measure other quantities in addition to the force exerted on its detection surface. For example, it can comprise measurement means for estimating the temperature of an object exerting a force on its detection surface, in particular by virtue of a temperature sensor below the bottom surface of the cavity. A piezoelectric layer can be added in order to measure any vibrations or accelerations.

The sensor according to the invention can be used, among other things, for robotics applications, in particular within the context of the dexterous robotic handling of objects. For example, it allows the qualities for handling objects by robots to be improved, in particular for detecting and identifying slippage of these objects.

In other application examples, the sensor is integrated into a human-machine touch interface.

The invention claimed is:
1. A force sensor comprising:
  at least one cavity defined by a hollow rigid support, the cavity defining at least two cavity surfaces having different orientations;
  on each of the cavity surfaces, at least one respective detection structure supported by the hollow rigid support and sensitive to a pressure exerted on a corresponding measurement surface of the detection structure; and
  a resiliently deformable medium at least partially filling the cavity by coming into contact with the measurement surfaces, and defining a detection surface configured to detect a force exerted thereon, the application of this force generating stresses on each detection structure as a result of the transmission of forces by the medium,
  each of the detection structures comprising:
    at least one first electrode disposed on a face of the detection structure on an underlying support; and
    at least one second electrode disposed on the face of the detection structure on the resiliently deformable medium,
  the resiliently deformable medium extending between at least two different detection structures.

2. The sensor according to claim 1, the cavity having the shape of a polyhedron.

3. The sensor according to claim 1, the resiliently deformable medium filling the cavity so as to be flush with an opening thereof.

4. The sensor according to claim 1, the resiliently deformable medium extending outside of the cavity.

5. The sensor according to claim 1, the detection surface defined by the resiliently deformable medium having an outwardly convex shape.

6. The sensor according to claim 1, at least one of the detection structures being a multi-point measurement structure.

7. The sensor according to claim 1, at least one of the detection structures being a single-point measurement structure.

8. The sensor according to claim 1, at least one of the detection structures comprising piezo-resistive or capacitive detection means.

9. The sensor according to claim 1, the first and second electrodes being at least partially overlaid.

10. The sensor according to claim 1, the first and second electrodes each having a linear shape.

11. The sensor according to claim 1, at least one of the detection structures comprising:
- a plurality of first electrodes disposed on a face of the detection structure on an underlying support; and
- a plurality of second electrodes disposed on the face of the detection structure on the resiliently deformable medium.

12. The sensor according to claim 11, the first electrodes comprising spaced apart parallel portions, with the second electrodes comprising spaced apart parallel portions intersecting, in a transparent top view, the portions of the first electrodes.

13. The sensor according to claim 11, at least one of the plurality of first electrodes being printed on a first layer of material with low conductivity, at least one of the plurality of second electrodes being printed on a second layer of material with low conductivity, and the first and second layers subsequently being assembled so that the electrodes are located on outer faces of the assembly.

14. The sensor according to claim 1, further comprising a circuit for processing signals delivered by the detection structures, representing pressures induced on the detection structures by the force applied onto the detection surface, and configured to process the signals in order to compute at least one component of the force.

15. The sensor according to claim 14, the processing circuit being configured to measure a distribution of the pressures on at least one of the detection structures.

16. The sensor according to claim 14, the processing circuit being configured to measure at least one component of a moment of the force exerted on the detection surface on a basis of distributions of pressure detected by detection structures on opposite surfaces of the cavity.

17. The sensor according to claim 14, comprising a plurality of single detection cells, each formed of a single cavity only equipped with single-point detection structures, the processing circuit being configured to measure at least one component of a single force likely to be exerted on a single detection cell on a basis of the pressures detected by the single-point detection structures of said detection cell.

18. The sensor according to claim 17, the processing circuit being configured to measure a distribution of at least one component of at least one force likely to be exerted on the detection surface of the sensor on a basis of knowledge of single forces applied onto the detection cells.

19. The sensor according to claim 1, comprising a plurality of single detection cells, each formed of a single cavity only equipped with single-point detection structures.

20. The sensor according to claim 19, the deformable medium extending into each of the single cavities and defining a detection surface configured to receive a force to be detected.

21. A method for measuring at least one component of a force exerted on the detection surface of the sensor as defined in claim 1, comprising:
- measuring electrical disturbances induced by stresses exerted on one or more measurement zones of the detection structures of the sensor due to transmission of forces from the resiliently deformable medium defining the detection surface; and
- computing, on a basis of the disturbances thus measured, at least one component of the force exerted on the sensor.

22. The method according to claim 21, at least one of the detection structures being a multi-point structure, in which a method a distribution of pressure on the detection structure is measured.

23. The method according to claim 21, wherein at least one component of a moment of the exerted force is computed on a basis of measurement of pressure fields on detection structures present on opposite surfaces of the cavity.

24. The method according to claim 21, wherein the force applied onto the detection surface is determined as a function of signals detected by the detection structures using a trained neural network.

25. The method according to claim 21, wherein the disturbances detected over all measurement points of a sensor structure having a matrix arrangement of electrodes with row electrodes and column electrodes are read, with M denoting a number of rows and N denoting a number of columns, an intersection of the electrodes defining measurement points, comprising:
- grounding all of the electrodes; and
- repeating, with i being an integer ranging between 1 and N:
  - powering an electrode i; and
  - repeating, with j being an integer ranging between 1 and M:
    - connecting electrode j to an input of a reading circuit;
    - reading a signal on the measurement point corresponding to the intersection of the electrodes i and j; and
    - grounding the electrode j; and
  - grounding the electrode i.

26. A method for manufacturing a force sensor comprising:
- at least one cavity defined by a hollow rigid support, the cavity defining at least two cavity surfaces having different orientations;
- on each of the cavity surfaces, at least one respective detection structure supported by the hollow rigid support and sensitive to a pressure exerted on a corresponding measurement surface of the detection structure; and
- a resiliently deformable medium at least partially filling the cavity by coming into contact with the measurement surfaces, and defining a detection surface configured to detect a force exerted thereon, the application of this force generating stresses on each detection structure as a result of the transmission of forces by the medium, wherein
- at least one first electrode having a linear shape is printed on a first layer of material with low electrical conductivity;
- at least one second electrode having a linear shape is printed on a second layer of material with low electrical conductivity;
- the first and second layers are assembled so that the first and second electrodes are on outer faces of the assembly and so that the second electrode intersects, in a front view, the first electrode;

the assembly of the first and second layers is integrated into a hollow support, the assembly defining the faces of a cavity; and the cavity is at least partially filled with a resiliently deformable material.

27. A force sensor comprising:

at least one cavity defined by a hollow rigid support, the cavity defining at least two cavity surfaces having different orientations;

on each of the cavity surfaces, at least one respective piezo-resistive detection structure supported by the hollow rigid support and sensitive to a pressure exerted on a corresponding measurement surface of the detection structure; and a resiliently deformable medium at least partially filling the cavity by coming into contact with the measurement surfaces and defining a detection surface configured to detect a force exerted thereon, the application of this force generating stresses on each detection structure as a result of the transmission of forces by the medium.

* * * * *